(12) United States Patent
McDaniel et al.

(10) Patent No.: US 6,226,233 B1
(45) Date of Patent: May 1, 2001

(54) MAGNETO-OPTICAL SYSTEM UTILIZING MSR MEDIA

(75) Inventors: Terry McDaniel, Morgan Hill; Jeffrey P. Wilde, Los Gatos; Joseph E. Davis, Morgan Hill; John F. Heanue, Fremont; Jeff Drazan, Atherton; Kurt E. Petersen; Jerry E. Hurst, Jr., both of San Jose; Joseph Drake, Mountain View, all of CA (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 08/844,208

(22) Filed: Apr. 18, 1997

Related U.S. Application Data

(60) Provisional application No. 60/022,775, filed on Jul. 30, 1996, provisional application No. 60/023,476, filed on Aug. 6, 1996, and provisional application No. 60/025,801, filed on Aug. 27, 1996.

(51) Int. Cl.$^7$ .................................................. G11B 11/00
(52) U.S. Cl. .................................... 369/13; 369/44.22
(58) Field of Search .................... 369/13, 44.14, 369/44.16, 44.17, 44.21, 44.22, 14, 44.38, 118, 199, 36, 283, 284, 44.15, 44.18, 110, 112, 116; 360/113, 59, 77.03, 114

(56) References Cited

U.S. PATENT DOCUMENTS

| | | | |
|---|---|---|---|
| 4,003,059 | 1/1977 | Sugiura et al. | 346/108 |
| 4,135,083 | 1/1979 | Van Alem et al. | 250/201 |
| 4,175,832 | 11/1979 | Umeki et al. | 350/285 |
| 4,449,204 | 5/1984 | Shimada et al. | 365/127 |
| 4,460,998 | 7/1984 | Yamada et al. | 371/10 |
| 4,532,619 | 7/1985 | Sugiyama et al. | 369/106 |
| 4,539,664 | 9/1985 | Deguchi et al. | 369/44 |
| 4,581,529 | 4/1986 | Gordon | 250/227 |
| 4,626,679 | 12/1986 | Kuwayama et al. | 250/227 |
| 4,633,450 | 12/1986 | Gueugnon | 369/13 |
| 4,740,951 | 4/1988 | Lizet et al. | 370/3 |

(List continued on next page.)

FOREIGN PATENT DOCUMENTS

| | | |
|---|---|---|
| 0331331A2 | 9/1989 | (EP) . |
| 0 460 890 A2 | 8/1991 | (EP) . |
| 0460890A2 | 12/1991 | (EP) . |
| 0 341 829 A2 | 9/1992 | (EP) . |
| 0 498 455 A2 | 12/1992 | (EP) . |
| 0614101A2 | 9/1994 | (EP) . |
| 0650133A2 | 4/1995 | (EP) . |
| 0712121A2 | 5/1996 | (EP) . |
| 0 501 477 A2 | 9/1996 | (EP) . |
| 0712121A3 | 12/1996 | (EP) . |
| 2 016 744 | 3/1979 | (GB) . |
| 2016744A | 3/1979 | (GB) . |
| 59-117180 | 6/1984 | (JP) . |
| WO95/13638 | 5/1995 | (WO) . |

OTHER PUBLICATIONS

Daneman, et al. "Laser–to–Fiber coupling Module Using a Micromachined Alignment Mirror", IEEE Photonics Technology Letters, vol. 8, No. 3, Mar. 1996, pp. 396–398.

Boysel, et al., "Integration of Deformable Mirror Devices with Optical Fibers and Waveguides", SPIE vol. 1793, Integrated Optics and Microstructures (1992), pp. 34–39.

(List continued on next page.)

*Primary Examiner*—Ali Neyzari
(74) *Attorney, Agent, or Firm*—Flehr Hohbach Test Albritton & Herbert L.L.P.

(57) ABSTRACT

A system for maximum magneto-optical data storage system is provided. The system utilizes double-sided first surface magnetically-induced super resolution storage media to provide the ability to access a data mark from a plurality of data marks within an optical spot size of an impinging optical beam of light.

49 Claims, 15 Drawing Sheets

U.S. PATENT DOCUMENTS

| | | | |
|---|---|---|---|
| 4,788,671 | * 11/1988 | Kanda | 369/13 |
| 4,796,226 | 1/1989 | Valette | 365/122 |
| 4,807,204 | 2/1989 | Mizutani et al. | 369/13 |
| 4,847,823 | 7/1989 | Lindow et al. | 369/110 |
| 4,882,231 | 11/1989 | Aratani | 428/611 |
| 4,890,178 | 12/1989 | Ichihara | 360/114 |
| 4,893,207 | 1/1990 | Maury et al. | 360/114 |
| 4,922,454 | 5/1990 | Taki | 365/122 |
| 4,945,400 | 7/1990 | Blonder et al. | 357/74 |
| 5,018,119 | 5/1991 | Aratani et al. | 369/13 |
| 5,022,018 | 6/1991 | Vogelgesang | 369/13 |
| 5,029,023 | 7/1991 | Bearden et al. | 369/69 |
| 5,105,408 | 4/1992 | Lee et al. | 369/44.15 |
| 5,119,361 | 6/1992 | Tanabe | 369/121 |
| 5,124,961 | 6/1992 | Yamaguchi et al. | 369/13 |
| 5,125,750 | 6/1992 | Corle et al. | 359/819 |
| 5,152,597 | 10/1992 | Barnard | 359/130 |
| 5,172,369 | 12/1992 | Chikuma et al. | 369/112 |
| 5,197,050 | 3/1993 | Murakami et al. | 369/13 |
| 5,199,090 | 3/1993 | Bell | 385/33 |
| 5,202,880 | 4/1993 | Lee et al. | 369/275.4 |
| 5,218,581 | 6/1993 | Ohata et al. | 369/13 |
| 5,233,444 | 8/1993 | Musha et al. | 359/15 |
| 5,241,520 | 8/1993 | Ohata et al. | 369/13 |
| 5,245,491 | 9/1993 | Horie et al. | 360/114 |
| 5,270,994 | 12/1993 | Nakayama | 369/100 |
| 5,278,812 | 1/1994 | Adar et al. | 369/44.12 |
| 5,289,454 | 2/1994 | Mohapatra et al. | 369/112 |
| 5,295,122 | * 3/1994 | Murakami et al. | 369/13 |
| 5,296,988 | 3/1994 | Fujino | 360/110 |
| 5,307,328 | 4/1994 | Jacobs et al. | 369/13 |
| 5,307,336 | 4/1994 | Lee et al. | 369/112 |
| 5,313,442 | 5/1994 | Ohtsuka et al. | 369/44.16 |
| 5,325,116 | 6/1994 | Sampsell | 346/108 |
| 5,325,244 | 6/1994 | Takano et al. | 360/77.03 |
| 5,329,512 | 7/1994 | Fukimoto et al. | 369/121 |
| 5,390,162 | 2/1995 | Fukumoto et al. | 369/116 |
| 5,448,538 | 9/1995 | Aratani et al. | 369/13 |
| 5,448,548 | 9/1995 | Taneya et al. | 369/121 |
| 5,470,627 | 11/1995 | Lee et al. | 428/64.4 |
| 5,477,528 | 12/1995 | Murakami et al. | 369/275.4 |
| 5,481,508 | 1/1996 | Watanabe et al. | 369/13 |
| 5,486,395 | 1/1996 | Murakami et al. | 428/64.3 |
| 5,495,456 | 2/1996 | Oka et al. | 369/13 |
| 5,497,359 | 3/1996 | Mamin et al. | 369/44.15 |
| 5,498,485 | 3/1996 | Nakayama et al. | 428/694 |
| 5,503,924 | 4/1996 | Osata | 428/336 |
| 5,504,731 | 4/1996 | Lee et al. | 369/112 |
| 5,528,565 | 6/1996 | Watanabe et al. | 369/13 |
| 5,532,997 | 7/1996 | Pauli | 369/112 |
| 5,535,189 | 7/1996 | Alon et al. | 369/102 |
| 5,536,926 | 7/1996 | Ikeda et al. | 235/462 |
| 5,563,852 | 10/1996 | Murakami et al. | 369/13 |
| 5,579,294 | 11/1996 | Ohata et al. | 369/58 |
| 5,592,445 | 1/1997 | Onagi | 369/13 |
| 5,616,428 | 4/1997 | Nishimura et al. | 428/694 |
| 5,625,483 | 4/1997 | Swartz | 359/224 |
| 5,737,302 | 4/1998 | Kasahara | 369/118 |
| 5,742,419 | 4/1998 | Dickensheets et al. | 359/201 |

OTHER PUBLICATIONS

Patent Abstracts of Japan Publication No. 08212579.
Patent Abstracts of Japan Publication No. 62177738.
Patent Abstracts of Japan Publication No. 60047244.
Patent Abstracts of Japan Publication No. 04259943.
Patent Abstracts of Japan Publication No. 62099938.
Patent Abstract of European Patent Application Publication No EP 0 501 477 A3.
Patent Abstract of European Patent Application Publication No. EP 0 341 829 A3.
Petersen, "Silicon Torsional Scanning Mirror," IBM J. Res. Develop. vol. 24 No. 5, Sep. 1980 pp. 631–637.
Opasnick, et al, "Optical fibers for magneto–optical recording," SPIE vol. 1499 1991, pp. 276–280.

* cited by examiner

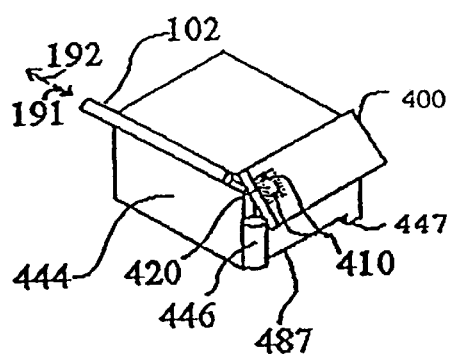
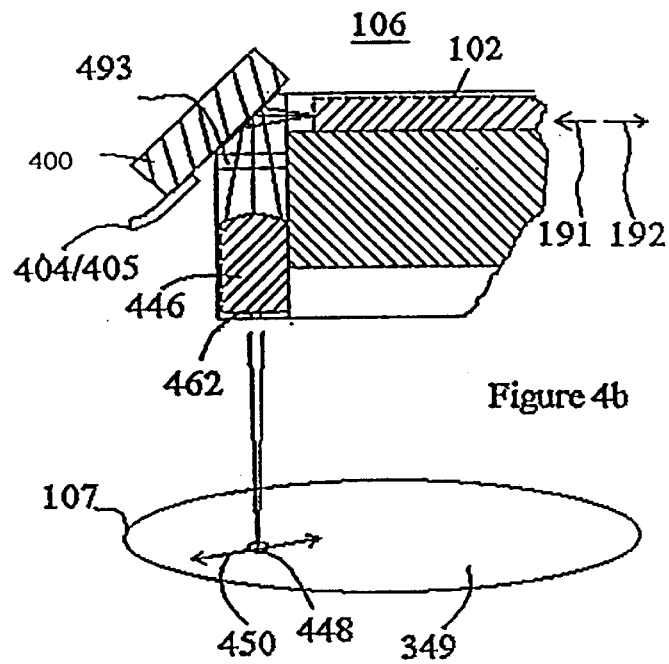
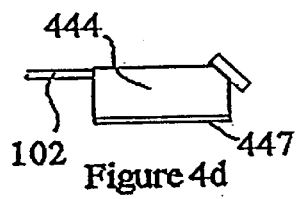
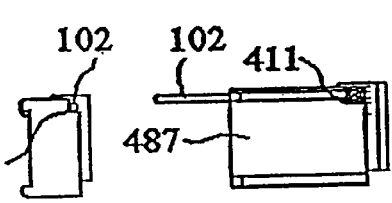
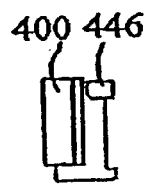
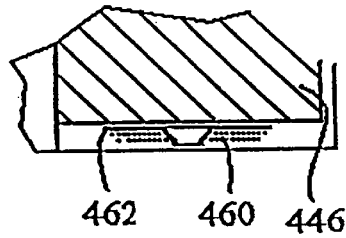
Figure 4a
Figure 4b
Figure 4d
Figure 4g  Figure 4f  Figure 4e  Figure 4c

MAGNETO-OPTICAL SYSTEM UTILIZING MSR MEDIA

CROSS REFERENCE TO RELATED APPLICATIONS

This application claims benefit of: provisional application Ser. No. 60/022,775, entitled "A Data Storage And Retrieval System Based on Flying Magneto-Optical Head," filed on Jul. 30, 1996; provisional application Ser. No. 60/023,476, entitled "A Data Storage And Retrieval System Based on A Flying Magneto-Optical Head," filed on Aug. 6, 1996; and provisional application Ser. No. 60/025,801, entitled "A Data Storage And Retrieval System Based on A Flying Magneto-Optical Head," filed on Aug. 27, 1996. This application is being filed concurrently with and is related to U.S. patent application Ser. No. 08/844,207 entitled "Data Storage System Having An Improved Surface Micro-Machined Mirror," filed on Apr. 18, 1997. The subject matter of each of these related applications is incorporated herein by reference. All applications are commonly assigned.

BACKGROUND OF THE INVENTION

1. Field of the Invention

The present invention relates generally to data storage and more particularly to maximum data storage in a magneto-optical data storage system.

2. Background Art

Hard disk technology has historically been limited by conventional magnetic head designs. A typical prior art Winchester magnetic storage system includes a magnetic head that has a slider element and a magnetic read/write element and is coupled to a rotary actuator magnet and coil assembly by a suspension and actuator arm so as to be positioned over a surface of a spinning magnetic disk. In operation, lift forces are generated by aerodynamic interactions between the magnetic head and the spinning magnetic disk. The lift forces are opposed by equal and opposite spring forces applied by the suspension such that a predetermined flying height is maintained over a full radial stroke of the rotary actuator assembly above the surface of the spinning magnetic disk.

Flying head designs have been proposed for use with magneto-optical (MO) storage technology. One motivation for using magneto-optical technology stems from the higher areal density capabilities of magneto-optical storage disks. However, despite the historically higher areal storage density available with MO storage technology, the prior art MO disk drive volumetric storage capacity has generally not kept pace with the volumetric storage capacity of magnetic disk drives.

One factor that continues to limit MO disk drives is the physical size of the head necessary to hold the various components required for accessing magneto-optical information. Conventional magneto-optical heads, while providing access to magneto-optical disks with areal densities on the order of 1 Gigabit/in$^2$, have been based on relatively large optical assemblies, which have made the physical size and mass of the heads rather bulky (typically 3–5 mm in a dimension).

A number of flying MO head designs incorporating magnetic and optical elements are described in U.S. Pat. No. 5,295,122 by Murakami, including: use of free-space alignment of a laser beam with a dynamically moving target, and a number of different configurations of the magnetic and optical elements that are required for reading and writing using the magneto-optical Kerr effect. The large size, mass, and number of elements limits the minimum head size and, therefore: the speed at which information from the MO disk may be accessed, the tracking bandwidth, and the data density that may be read or written. In the prior art, the large physical size of MO flying heads also limits the spacing between magneto-optical disks to a finite minimum value. Consequently, because the volume available in standard height disk drives is limited, magneto-optical disk drives for use with magneto-optical flying heads have generally not been available as high capacity multi-platter commercial products.

During conventional writing of information in MO disk drives, an incident laser beam heats a selected spot of interest on the MO disk to approximately the Curie point. A time varying vertical bias magnetic field is used to define a pattern of "up" or "down" magnetic domains in a recording layer. Subsequently, as the selected spot of interest cools, information is recorded on the MO disk. The size of the magnetic field that is generated provides a lower limit on a maximum data density that may be recorded on the MO disk. One prior art approach for generating the necessary magnetic field for writing of information has relied on second surface recording techniques. With the second surface recording method, the magnetic field is applied to the spot of interest on the MO disk from a direction opposite that of the incident laser beam. With this approach, only one side of a MO disk may be used.

In addition to the aforementioned limitations, information access in prior art magneto-optical storage systems is limited by the size of the optical spot to which an incident laser beam may be focused on the disk surface. Magneto-optical information access requires the use of polarized laser light for reading and writing information on an MO disk. In the case of reading information, MO technology makes use of a magneto-optical effect ("Kerr" effect) to detect a modulation of polarization rotation imposed on the linearly polarized incident laser beam by the recorded domain marks in the recording layer. The polarization rotation (representing the information stored at recorded marks or in the edges of the recorded marks) is embodied in a reflection of the linearly polarized laser beam and is converted by optics and electronics for readout.

To date, only conventional quadrilayer MO disk structures have been used in commercial MO drives. With conventional MO disks it has not been possible to access information in magnetic domains when the incident laser beam laser beam covers more than one magnetic domain at a time. This limit is substantially proportional to the ratio of the wavelength of the laser beam to the numerical aperture (NA) of the optical elements used. In conventional prior art quadrilayer MO disk structures, therefore, recordation of magnetic domain marks smaller than the minimum incident optical spot size does not provide any benefit.

What is needed, therefore, is an apparatus and method that improves upon prior art access to, and storage of magneto-optical information.

SUMMARY OF THE INVENTION

The present invention improves access to and storage of magneto-optical information. The present invention includes at least one first surface double-sided storage disk in a data storage and retrieval system. In the present invention, each surface of the at least one storage disk includes at least one layer. In the present invention, the at least one layer includes a storage layer. In the present invention, the storage layer includes a magnetically-induced super resolution structure. The present invention selectively directs an impinging optical beam to form an optical spot on the storage layer and to record data marks in the storage layer. In the present invention, a small size and low profile magnetic coil and yoke improves the ability to record a plurality of small data marks at a high rate and at a short distance from the surface of the storage disk. In the present invention, the plurality of data marks may be recorded within a size of the optical spot. Using the magnetically-induced super resolution structure, the present invention may selectively access within the size of the optical spot a desired one of the plurality of data marks. In the present invention, low-profile and low mass optical and magnetic elements may be offset on an optical head to improve access to data stored at an outer periphery and within the magnetically-induced super resolution structure of the at least one magneto-optical storage disk. In the present invention, the optical head includes a low profile and low mass flying magneto-optical head that permits increased volumetric storage capacity of the magneto-optical data storage and retrieval system. In the present invention, the flying head includes means for moving an optical element so as to maintain and improve access to information stored on at least one storage disk. The present invention may further include means for independent yet simultaneous access of information stored on a plurality of storage disks.

BRIEF DESCRIPTION OF THE DRAWINGS

FIGS. 4a–4f are diagrams showing the flying magneto-optical head of the magneto-optical data storage in a perspective, a side cross-sectional, an expanded cross-section, a side, a front, a bottom, and a rear view, respectively;

DETAILED DESCRIPTION OF THE PREFERRED EMBODIMENTS

Figure 1:
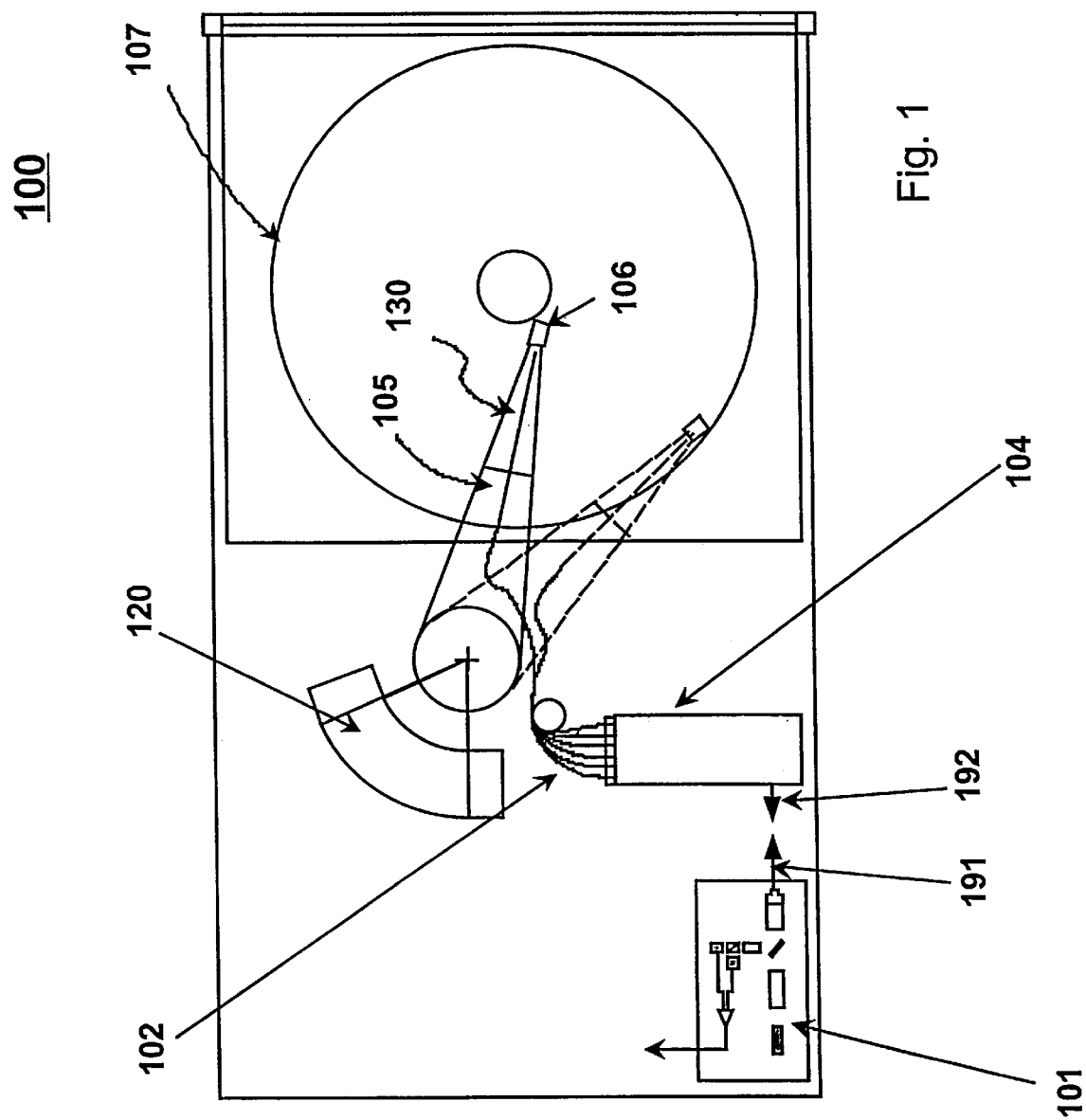
FIG. 1 is a diagram showing a magneto-optical data storage and retrieval system.

Referring in detail now to the drawings wherein similar parts of the invention are identified by like reference numerals, there is seen in FIG. 1 a diagram showing a magneto-optical data storage and retrieval system. In a preferred embodiment, a magneto-optical (MO) data storage and retrieval system 100 includes a set of Winchester-type flying heads 106 that are adapted for use with a set of double-sided MO disks 107 (one flying head for each MO disk surface). The set of flying heads 106 (hereinafter referred to as flying MO heads) are coupled to a rotary actuator magnet and coil assembly 120 by a respective suspension 130 and actuator arm 105 so as to be positioned over the surfaces of the set of MO disks 107. In operation, the set of MO disks 107 are rotated by a spindle motor 195 so as to generate aerodynamic lift forces between the set of flying MO heads 106 and so as to maintain the set of flying MO heads 106 in a flying condition approximately 15 micro-inches above the upper and lower surfaces of the set of MO disks 107. The lift forces are opposed by equal and opposite spring forces applied by the set of suspensions 130. During non-operation, the set of flying MO heads 106 are maintained statically in a storage condition away from the surfaces of the set of MO disks 107.

System 100 further includes: a laser-optics assembly 101, an optical switch 104, and a set of single-mode PM (polarization maintaining) optical fibers 102. In the exemplary embodiment, each of the set of single-mode PM optical fibers 102 are coupled through a respective one of the set of actuator arms 105 and suspensions 130 to a respective one of the set of flying MO heads 106. As will be discussed shortly, the system 100 is used in a configuration that, compared to the prior art, improves access to, and storage of, magneto-optical information.

Figure 2:
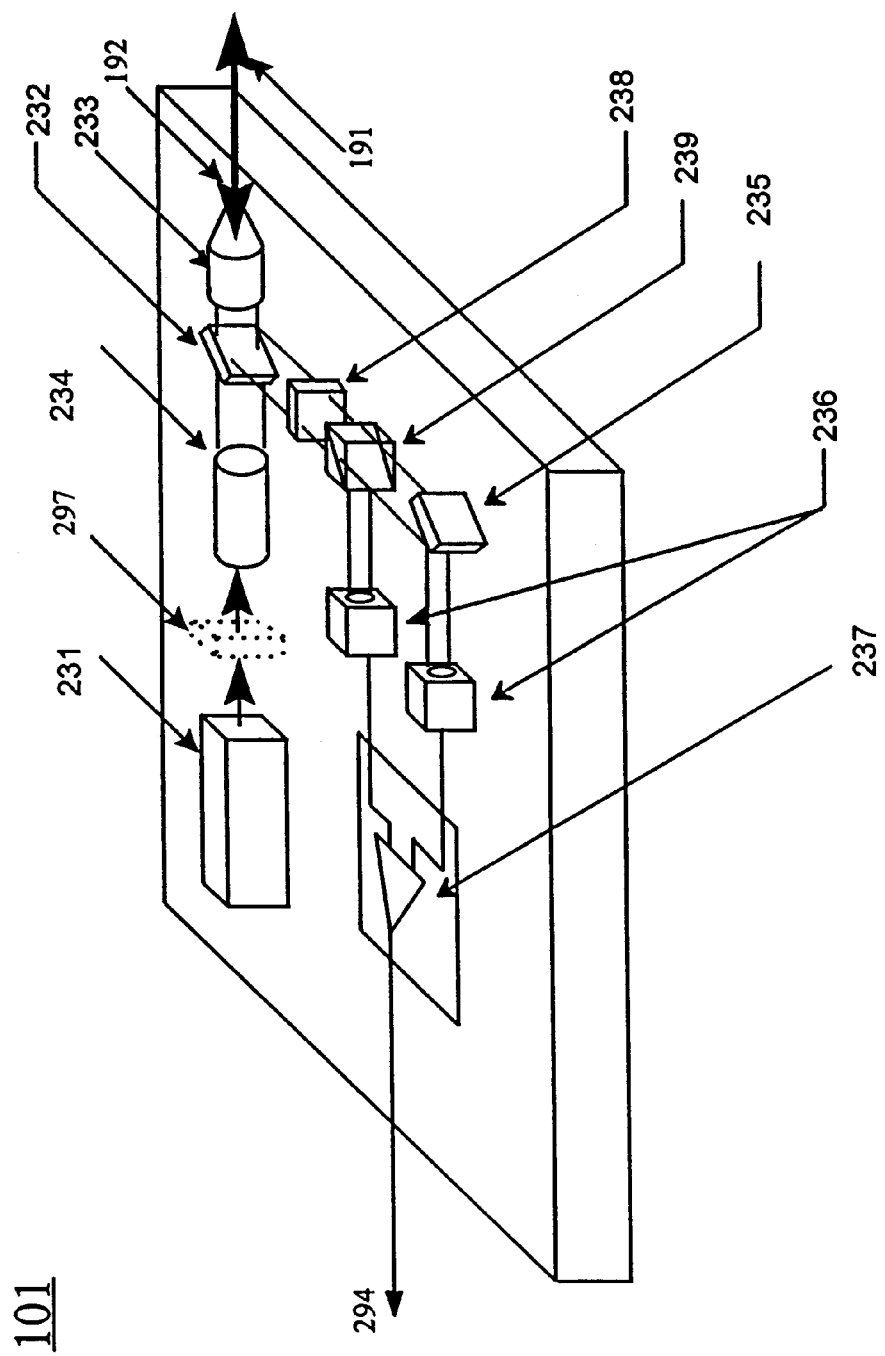
FIG. 2 is a diagram showing the laser-optics assembly of the magneto-optical data storage and retrieval system of FIG. 1.

FIG. 2 is a diagram showing the laser-optics assembly of the magneto-optical data storage and retrieval system of FIG. 1. In FIG. 2, the laser-optics assembly 101 is shown to include a linearly polarized diode laser source 231 operating in a visible or near ultraviolet frequency region and emitting an optical power sufficient for reading and writing using the set of MO disks 107. In a first embodiment, the laser diode source may be a RF modulated laser source. In a second embodiment, the linearly polarized laser source 231 may be a distributed feed-back (DFB) laser source. In an exemplary embodiment, the linearly polarized laser source 231 is selected to operate within a range 635–685 nm; however, a laser source of other frequencies could also be used. The laser-optics assembly 101 further includes: a collimating optics 234, a low wavelength dispersion leaky beam splitter 232, and a coupling lens 233. The laser-optics assembly 101 directs (from the linearly polarized laser source 231) a linearly polarized outgoing laser beam 191 (shown in FIG. 1) to the optical switch 104. The laser-optics assembly 101 further includes: a ¼ wave plate 238, a mirror 235, and a polarizing beam splitter 232. In the first embodiment, a linearly polarized reflected laser beam 192 (shown in FIG. 1) is directed by the optical switch 104 to the coupling lens 233, and is routed by the leaky beam splitter 232 to a differential detector comprising: the ¼ wave plate 238, the mirror 235, and the polarizing beam splitter 239. In the second embodiment, an optical isolator 297 is included between the laser source 231 and the collimating lens 234. As is well established in the art, this type of differential detection scheme measures the optical power in two orthogonal polarization components of the reflected laser beam 192, with a differential signal being a sensitive measure of polarization rotation induced by the Kerr effect at the surface of one of the set of MO disks 107. In both embodiments, after conversion by a set of photodiodes 236, the differential signal is processed by the differential amplifier 237 for output as signal 294. The present invention is not meant to be limited to the aforementioned arrangement of optical elements and sources of light, as other techniques for directing the outgoing laser beam 191 and for detecting the reflected laser beam 192 are well known in the art.

Figure 3:
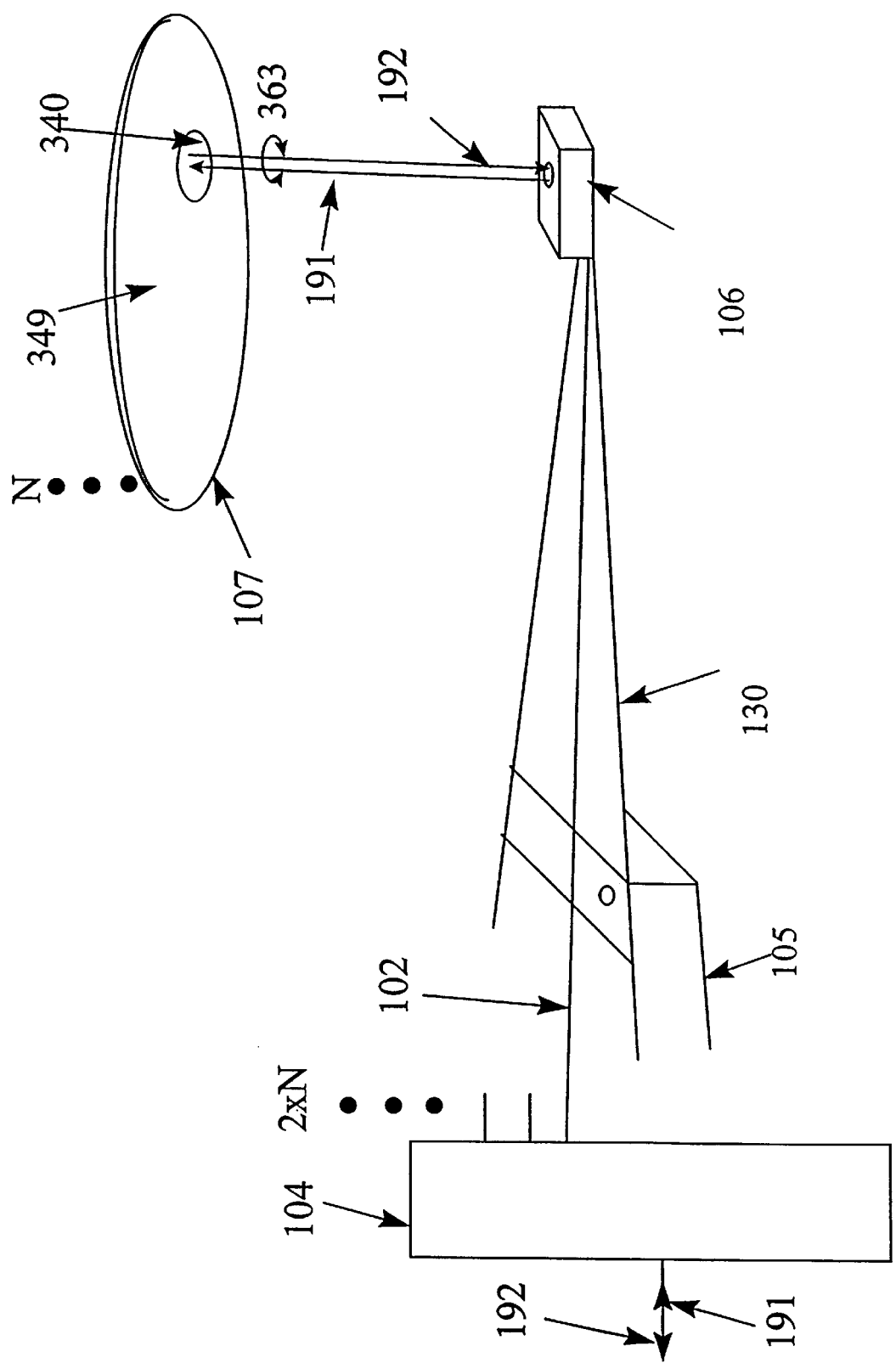
FIG. 3 is a diagram showing a representative optical path that includes the use of a DFB laser source.

FIG. 3 is a diagram showing a representative optical path that includes the use of a DFB laser source. In a preferred embodiment, a representative optical path is shown in FIG. 3 to include: the optical switch 104, one of the set of single-mode PM optical fibers 102, and one of the set of flying MO heads 106. The optical switch 104 provides sufficient degrees of selectivity for directing the outgoing laser beam 191 (with reference to laser source 231) towards a respective proximal end of a respective single-mode PM optical fiber 102. The outgoing laser beam 191 is further directed by the single-mode PM optical fiber 102 to exit a respective distal end so as to pass through the flying MO head 106 onto a recording/storage layer 349 of a respective MO disk 107.

In the preferred embodiment the outgoing laser beam 191 is provided by a linearly polarized laser source 231 that is a DFB laser source. A distributed feedback (DFB) diode laser source, unlike an RF-modulated Fabry-Perot diode laser, produces a very narrowband single-frequency output due to the use of a wavelength selective grating element inside the laser cavity. When linearly polarized light from a laser source 231 that is a DFB laser source is launched into a single-mode PM optical fiber 102, the light exiting the optical fiber includes a polarization state that depends on the relative orientation between the fiber axes and the incident polarization, and moreover, the output polarization state is very stable in time as long as external perturbations which alter the fiber birefringence are negligible. This behavior is in contrast to that observed with an RF-modulated Fabry-Perot diode laser source which is characterized by high-frequency fluctuations in its spectral output. With a RF modulated laser source, when linearly polarized light is launched into a single-mode PM optical fiber 102, the laser wavelength fluctuations lead to corresponding polarization fluctuations at the output of the fiber. The resulting polarization noise is minimized when the incident light is launched with its polarization axis aligned with one of the axes of the fiber (discussed below), but even in this case the polarization noise is larger than the corresponding DFB laser case owing to wavelength dependent mode coupling (mode coupling in PM fibers is a phenomenon whereby a small portion of the light that is being guided along one polarization axis is coupled into the orthogonal axis by intrinsic or stress-induced defects). In MO recording it is preferable that the polarization noise be kept to a minimum, such that a SNR in the range of 20–25 dB can be achieved. The present invention identifies that a DFB laser source enables use of the single-mode PM optical fiber 102 for delivery and return of polarized laser light to and from the MO disk 107 while maintaining the aforementioned SNR.

During writing of information, the outgoing laser beam 191 is selectively routed by the optical switch 104 to the MO disk 107 so as to lower a coercivity of the recording/storage layer 349 by heating a selected spot of interest 340 to approximately the Curie point of the recording/storage layer 349. Preferably, the optical intensity of outgoing laser beam 191 is held constant, while a time varying vertical bias magnetic field is used to define a pattern of "up" or "down" magnetic domains perpendicular to the MO disk 107. This technique is known as magnetic field modulation (MFM). Alternatively, outgoing laser beam 191 may be modulated in synchronization with the time varying vertical bias magnetic field at the spot of interest 340 in order to better control domain wall locations and reduce domain edge jitter. Subsequently, as the selected spot of interest 340 cools, information is encoded within the recording/storage layer 349 of the respective spinning disk 107.

During readout of information, the outgoing laser beam 191 (at a lower intensity compared to writing) is selectively routed to the MO disk 107 such that at any given spot of interest 340, the Kerr effect causes (upon reflection of the outgoing laser beam 191 from the recording/storage layer 349) a reflected laser beam 192 to have a rotated polarization of either clockwise or counter clockwise sense 363 that depends on the magnetic domain polarity at the spot of interest 340.

The aforementioned optical path is bi-directional in nature. Accordingly, the reflected laser beam 192 is received through the flying MO head 106 and enters the distal end of the single-mode PM optical fiber 102. The reflected laser beam 192 propagates along the single-mode PM optical fiber 102 to exit at its proximal end and is selectively routed by the optical switch 104 for transmission towards the laser-optics assembly 101 for subsequent conversion to the signal 294.

FIGS. 4a–f are diagrams showing the flying magneto-optical head of the magneto-optical data storage in a perspective, a side cross-sectional, an expanded cross-section, a side, a front, a bottom, and a rear view, respectively. In FIG. 4a, the flying MO head 106 is shown for use above a recording/storage layer 349 of one of the set of MO disks 107. The flying MO head 106 includes: a slider body 444, an air bearing surface 447, a quarter-wave plate 493, a reflective substrate 400, objective optics 446, a magnetic coil 460, and a yoke 462. The slider body 444 is dimensioned to accommodate the working distances between the objective optics 446, the single-mode PM optical fiber 102, and the reflective substrate 400. The reflective substrate 400 may include a reflective surface which is aligned so as to direct the outgoing laser beam 191 and 192 to and from the recording/storage layer 349. Although, slider body 444 may include industry standard "mini", "micro", "nano", or "pico" sliders, alternatively dimensioned slider bodies 444 may also be used (as determined by the aforementioned dimensional constraints of the elements used with the flying MO head 106). Accordingly, in the preferred embodiment, the slider body 444 comprises a mini slider height (889 um) and a planar footprint area corresponding to that of a nano slider (1600×2032 um).

The single-mode PM optical fiber 102 is coupled to the slider body 444 along an axial cutout 443, and the objective optics 446 is coupled to the slider body 444 along a vertical corner cutout 411. Although, in the preferred embodiment the axial cutout 443 is located along a periphery of the slider body, and the vertical cutout 411 is located at a corner of the slider body 444, the axial cutout 443 and the vertical cutout 411 may be located at other positions on the flying MO head 106, for example, between the periphery and a central axis or, alternatively, along the central axis itself. Those skilled in the art will recognize that positioning the optical fiber 102 and the objective optics 446 at other than along a central axis may function to affect a center of mass of the magneto-optical head 106 and, thus, its flying dynamics. Accordingly, the point of attachment of the flying MO head 106 to the suspension may require adjustment to compensate for off-center changes in the center of mass of the magneto-optical head 106. Preferably, the cutouts 443 and 411 may be designed as channels, v-grooves, or any other suitable means for coupling and aligning the single-mode optical fiber 102 and objective optics 446 to the flying MO head 106. In the preferred embodiment, the laser beams 191 and 192 traverse an optical path (to and from the recording/storage layer 349 of the MO disk 107) that includes: the single-mode PM optical fiber 102, the reflective substrate 400, the quarter-wave plate 493, and the objective optics 446. In the preferred embodiment, the single-mode PM optical fiber 102 and the objective optics 446 are positioned within their respective cutouts to achieve focus of the outgoing laser beam 191 within the spot of interest 340 (FIG. 3) as a focused optical spot 448. The single-mode PM optical fiber 102 and the objective optics 446 may be subsequently secured in place by using ultraviolet curing epoxy or similar adhesive.

As compared to free space delivery of polarized laser light, the single-mode PM optical fiber 102 provides an accurate means of alignment and delivery of both the outgoing 191 laser beam to the reflective substrate 400, and of the reflected laser beam 192 from the reflective substrate 400 back to the laser-optics assembly 101. The single-mode optical fiber 102 also provides a low mass and low profile optical path. The low mass of the single-mode optical fiber 102 provides a method of delivering light to the flying MO head 106 without interfering substantially with the operating characteristics of the actuator arm 105 and suspension 130. The low profile of the single-mode optical fiber 102 provides the ability to reduce the distance between a set of MO disks without interfering with delivery of light or operation of the flying MO head 106. The single-mode PM optical fiber 102 functions as an aperture of a confocal optical system that has a large depth resolution along its optical axis and an improved transverse resolution. As compared to a non-confocal system, the improved transverse resolution improves the detection of smaller magnetic domain orientations as well as detection of magnetic domain edges. The large depth resolution minimizes cross-talk between closely spaced surface recording levels when using multi-level storage media.

In an exemplary embodiment, the reflective substrate 400 may comprise a steerable micro-machined mirror assembly. A steerable micro-machined mirror assembly is disclosed in commonly assigned U.S. patent application Ser. No. 08/844,207 entitled "Data Storage System Having An Improved Surface Micro-Machined Mirror," filed on Apr. 18, 1997, and which incorporated herein by reference. In the preferred embodiment, the steerable micro-machined mirror assembly 400 includes a small (in one embodiment, less than 300 um square) reflective central mirror portion 420 (illustrated in FIG. 4a by dashed lines representative of the reflective central mirror portion on a side of the steerable micro-machined mirror assembly 400 opposite to that which is visible). The small size and mass of the steerable micro-machined mirror 400 contributes to the ability to design the flying MO head 106 with a low mass and a low profile. As used in the magneto-optical storage and retrieval system 100, fine tracking and short seeks to a series of nearby tracks may be performed by rotating the reflective central mirror portion 420 about a rotation axis so that the propagation angle of the outgoing laser beam 191 is changed before transmission to the objective optics 446. The reflective central mirror portion 420 is rotated by applying a differential voltage to a set of drive electrodes 404/405 (FIG. 4b). The differential voltage on the electrodes creates an electrostatic force that rotates the reflective central mirror portion 420 about a set of axial hinges 410 and enables the focused optical spot 448 to be moved in the radial direction of the MO disk 107. In the exemplary embodiment, a rotation of approximately +/−2 degrees of the reflective central mirror portion 420 is used for movement of the focused optical spot 448 in an approximately radial direction 450 of the MO disk 107 (equivalent to approximately +/−4 tracks) for storage and retrieval of information, track following, and seeks from one data track to another data track. In other embodiments, other ranges of rotation of the reflective central mirror portion 420 are possible. Coarse tracking may be maintained by adjusting a current to the rotary actuator magnet and coil assembly 120 (FIG. 1). The track following signals used to follow a particular track of the MO disk 107 may be derived using combined coarse and fine tracking servo techniques that are well known in the art. For example, a sampled sector servo format may be used to define tracks. The servo format may include either embossed pits stamped into the MO disk 107 or magnetic domain orientations that are read similar to data marks. If embossed pits are used, those skilled in the art will recognize that an adder output circuit may be used in addition to of the differential output circuit 237. In the prior art, conventional multiple platter Winchester magnetic disk drives use a set of respective suspensions and actuator arms that move in tandem as one integral unit. Because each flying magnetic head of such an integral unit is fixed relative to another flying magnetic head, during track following of a particular magnetic disk surface simultaneous track following of another magnetic disk surface is not possible. In contrast, irrespective of the movement of the set of actuator arms 105 and set of suspensions 130, a set of the steerable micro-machined mirror assemblies 400 of the present invention may be used to operate independently and thus permit track following and seeks so as to read and/or write information using more than one MO disk surface at any given time. Independent track following and seeks using a set of concurrently operating steerable micro-machined assemblies 400 would preferably require a set of separate respective read channel and fine track electronics and mirror driving electronics. Because the aforementioned embodiment would also preferably require use of separate laser-optics assemblies 101, an optical switch 104 for switching between each of the separate optical paths would not necessarily be required.

Figure 5:
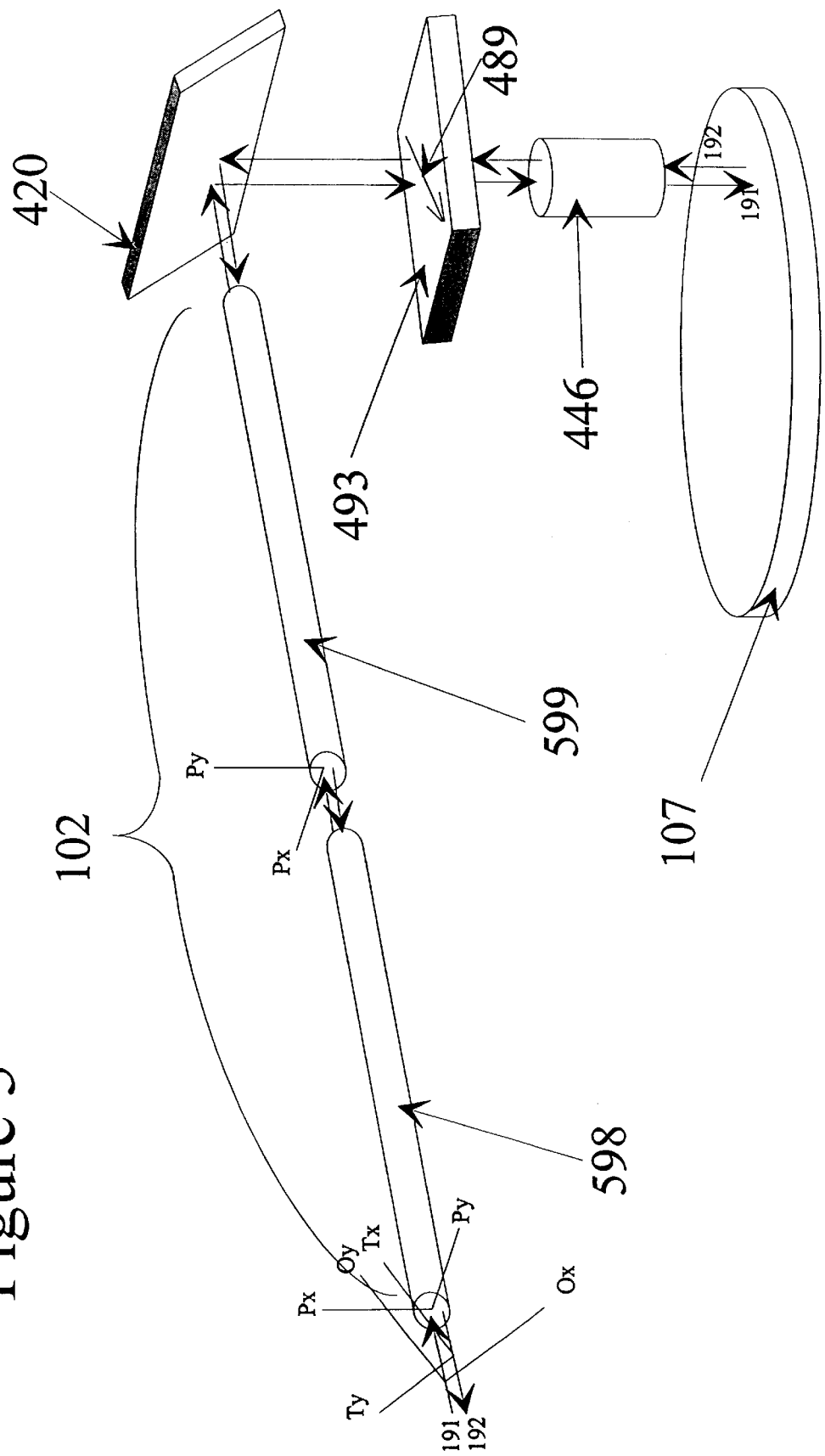
FIG. 5 is a diagram showing a representative optical path that includes the use of a RF modulated laser source.

FIG. 5 is a diagram showing a representative optical path that includes the use of a RF modulated laser source. In FIG. 5 the representative optical path is illustrated with reference to an alternative embodiment, which is shown in FIG. 5 to include: the reflective substrate 420, the quarter-wave plate 493, the objective optics 446, and the single-mode PM optical fiber 102. In the alternative embodiment a RF modulated diode laser is used as the laser source 231 (FIG. 2). In the alternative embodiment, the single-mode PM optical fiber 102 comprises a first segment 598 coupled to a second segment 599, each segment comprising a fast axis (Px) and slow axis (Py). The fast axis of the first segment 598 is preferably aligned with the slow axis of the second segment 599. The outgoing laser beam 191 has an Ox component and an Oy component and is preferably linearly polarized at an angle of approximately 45 degrees relative to the Px and Py axes of the first segment 598. The quarter-wave plate 493 comprises a fast axis 489 which is preferably aligned in the optical path at an angle of 45 degrees relative to the Px and Py axes of the second segment 599. In an exemplary embodiment, the quarter-wave plate 493 comprises a square dimension of about 250 um, a thickness of about 89 um, and a phase retardation of about 90 degrees (+/−3 degrees) at a wavelength of interest.

Those skilled in the art will recognize that the first and second segments 598 and 599 may be subject to external and/or internal stresses resulting from: mechanical motion, temperature, and pressure; and that, these stresses may affect optical properties of the first and second segments 598 and 599, for example, their birefringent properties. Accordingly, as the Ox and Oy polarization components propagate through the first and second segments 598 and 599, the Oy component acquires a shift in phase of $\phi$ relative to the Ox component. The polarization components Ox and Oy exit the distal end of the second segment 599 and are reflected by the reflective substrate 420 so as to be incident with the surface of the quarter-wave plate 493. The Ox and Oy components are preferably reflected equally (within 3% of each other) from a gold surface of the reflective substrate 420. As the Ox and Oy components pass through the quarter-wave plate 493, the Ox component is converted to a left-hand circular polarization, and the Oy component is converted to a right-hand circular polarization, and the two circular polarizations sum to preferably be an outgoing linear polarization having a polarization angle that depends on the phase shift $\phi$. The outgoing linear polarization is reflected from the MO disk 107 and is rotated by the Kerr effect so as to return with a net phase shift between the circular polarization components equal to $\phi+\Delta$, where $\Delta$ is a phase shift introduced by the Kerr effect. The reflection from the MO disk 107 reverses the sense of each circular polarization (i.e., left-hand becomes right-hand and vice-versa), such that, upon a second pass through the quarter-wave plate 493, the right-hand component is converted to a linear polarization component Tx, and the left-hand component is converted to a linear polarization component Ty. The Tx and Ty polarization components of the reflected laser beam 192 are preferably rotated 90 degrees with respect to the Ox and Oy polarization components of the outgoing laser beam 191, and the Tx component exhibits a phase shift of $\phi+\Delta$ relative to the Ty component. In an exemplary embodiment, in which the optical transit time through the PM optical fiber is less than 5 ns, the birefringence of the PM optical fiber will not change appreciably; thus, as the Tx polarization component of the reflected laser beam 192 propagates back through the second and first segments 599 and 598, the Ty component acquires an additional phase shift of $\phi$ with respect to the Tx component. In this manner, after exiting the proximal end of the first segment 598, the Ty polarization component of the reflected laser beam 192 is phase shifted relative to the Tx polarization component, preferably by only the Kerr phase $\Delta$. The polarization state that emerges from the fiber is elliptical and is converted by the quarter-wave plate 238 of laser-optics assembly 101 to preferably have a linear polarization with a polarization angle proportional to $\Delta$. Subsequently, the linear polarization is detected and converted so as to represent the information stored at the spot of interest 340 as the output signal 294. Although the present invention minimizes the effects of birefringence introduced by the first and second segments 598 and 599, the quarter-wave plate 493 also minimizes phase shifts introduced by the optical properties of the reflective surface of the reflective substrate 420. Additionally, although the quarter-wave plate 493 is disclosed to be positioned in the optical path after the reflective substrate 420, in an alternative embodiment, the quarter-wave plate 493 may be positioned between the objective optics 446 and the MO disk 107.

The present invention recognizes that use of a laser source 231 that comprises a RF modulated laser diode may reduce the effects of optical feedback of the reflected laser beam 192 to the laser diode. Those skilled in the art will recognize that RF modulated diodes do not operate at a single wavelength, but rather, as a source of laser light having multimode spectral characteristics (typically with a 10 nm bandwidth) and that for each $\lambda$, the corresponding phase shift may be minimized by specifying the quarter-wave plate 493 to operate over the bandwidth of the laser source 231. However, those skilled in the art will recognize that when the Ox and Oy components of the outgoing laser beam 191 are not optimally aligned at 45 degrees relative to the Px and Py axes of the first segment 598, and/or the quarter-wave plate 493 is not exactly quarter-wave, and/or other optical components in the optical path are not aligned, the phase shift $\phi$ and, thus, the RF noise components it generates in the output signal 294 may exhibit a dependence on the wavelength fluctuations of the laser source 231. Accordingly, because in practice the optical components of system 100 may be aligned to only a limited degree of precision, the wavelength fluctuations of the RF-modulated laser source 231 may function to degrade the signal-to-noise ratio of the output signal 294.

The present invention identifies that by rotating the fast axis of the first segment 598 orthogonally to the fast axis of the second segment 599, the RF phase noise created by wavelength fluctuations of the laser source 231 may be canceled in a common mode manner. The first and second segments 598 and 599 may comprise commercially available single-mode PM optical fiber selected to operate at the frequency of interest. The first segment 598 is coupled to the second segment 599 using fusion splicing techniques that are well known in the art, and the fast axis of the first segment 598 is aligned with the slow axis of the second segment 599, preferably to within an angle of less than 0.5 degree. Additionally, the first and the second segments 598 and 599 are preferably selected from the same optical fiber manufacturing batch and are preferably of equal length to a precision of less than 1 mm. Those skilled in the art will understand that the phase shift encountered by a linearly polarized light propagating with a wavelength $\lambda$ through each of the first and second segments 598 and 599 is proportional to $2\pi b L/\lambda$ (where b is the birefringence of the PM optical fiber and L is the PM optical fiber length). Therefore, fluctuations in the wavelength $\lambda$ yield corresponding fluctuations in the phase shift. By aligning the fast axes of the first and second segments 598 and 599 of the PM optical fiber 102 orthogonally to each other and by selecting the two segments 598 and 599 to be approximately equal in length, the present invention identifies that the net birefringence introduced in the optical path by the two segments will be approximately zero and, thus, the phase shift $\phi$ will be approximately zero and independent of wavelength. In practice, the non-zero net birefringence will be proportional to the difference between the lengths of the first and the second segments 598 and 599, hence, as compared to the prior art, the RF phase noise in the output signal 294 will be reduced. In the aforementioned alternative embodiment that uses a RF modulated diode laser source 231, as compared to an embodiment (not shown) in which a continuous one meter in length PM optical fiber is used in place of the first and second segments 598 and 599, the signal-to-noise ratio of the output signal 294 is reduced approximately 40 dB.

Figure 6:
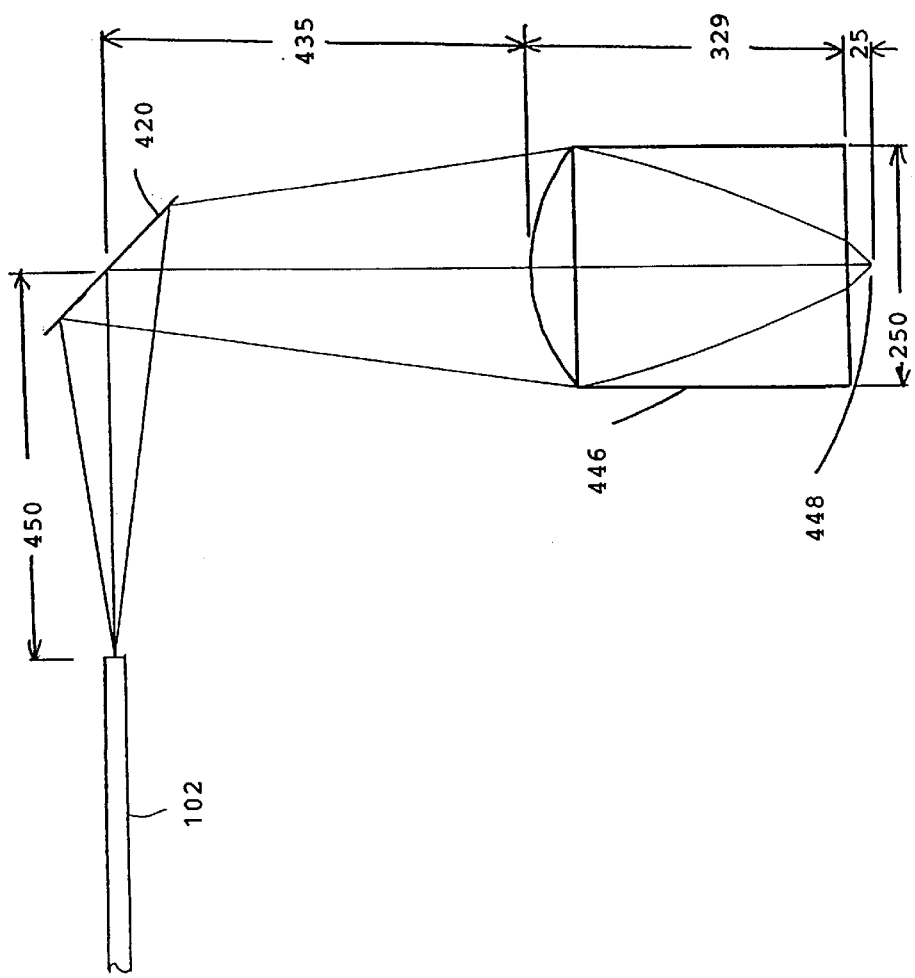
FIG. 6 is a diagram showing an embodiment of the GRIN lens.

FIG. 6 is a diagram showing an embodiment of the GRIN lens. In the preferred embodiment, the objective optics 446 includes a micro plano-convex GRIN lens (Graded Index) lens of a non-conventional design that provides a high effective NA, low size, and low mass single-element objective optics for use with the flying MO head 106. The non-conventional design of the GRIN lens 446 derives from the radius of curvature that is applied to one plano-surface of a very small diameter conventional plano-plano GRIN rod lens. In the preferred embodiment, this goal is achieved by polishing a conventional plano-plano GRIN rod lens so as to provide a convex surface at planar end of the GRIN rod lens. In the preferred embodiment shown in FIG. 6, the objective optics 446 is a cylindrical plano-convex GRIN lens that includes at a bottom end a plano surface and at an opposite end a convex surface with a radius of curvature of 190 um. As compared to the prior art, the cylindrical and planar portions of the GRIN lens 446 improve the ability to align an optical axis of the objective optics 446 relative to the representative optical path passing through the respective cutout 411 (FIG. 4*f*) of the flying MO head 106. Use of a single optical element GRIN lens 446 also eliminates a prior art requirement for alignment of multiple objective optic elements relative to each other. In an exemplary embodiment, the GRIN lens 446 diameter is approximately 0.250 um, and the GRIN lens 446 length is approximately 329 um. An optical path length from a center point of the reflective central mirror portion 420 to the convex surface of the GRIN lens 446 is approximately 435 um. The single-mode PM optical fiber 102 has an NA of approximately 0.15, and the distal end of the single-mode PM optical fiber 102 is positioned approximately 450 um from the center point of the reflective central mirror portion 420. The GRIN lens 446 comprises a gradient index function of sqrt(A)=3.2, which provides an effective NA of approximately 0.67. In an exemplary embodiment, in which the laser-optics source 231 (FIG. 2) operates at a wavelength of 650 nm, over the propagation angle of the outgoing laser beam 191, and as the reflective central mirror portion 420 rotates, the optical spot 448 is preferably maintained with a full width at half-maximum intensity (FWHM) of approximately 0.54 um and with a RMS wavefront error of approximately $\lambda/20$ at a point approximately 25 um below the convex surface of the GRIN lens 446. The GRIN lens objective optics 446, therefore, provides a small size and low mass high NA micro-objective element that is easy to align within the flying MO head 106 during manufacture. One exemplary embodiment of a plano-convex GRIN lens has been described above; however, it will be appreciated that the GRIN lens 446 may comprise other geometries.

The objective lens comprising the GRIN lens 446 has been described as a single element objective lens; however, additional objective optics may also be used to enhance the properties of the GRIN lens 446. For example, the objective optics may include either an aplanatic lens or a solid immersion lens in conjunction with the GRIN lens 446. Use of an additional lens element may achieve a larger numerical aperture and hence a smaller focused optical spot size. A smaller spot size would preferably increase higher areal data densities to be written to and read from the MO disk 107. Micro-optic lenses made by molding glass or plastic may also be used in place of the GRIN lens 446.

As is discussed above, the present invention uses objective optics 446 that are manufactured to very small dimensions. The optical and geometrical properties of the objective optics 446 permit the mounting of a small diameter and low profile magnetic coil 460 and yoke 462 on a bottom surface of the flying MO head 106 or, alternatively, on or near the surface of the objective optics 446, without interfering with the aerodynamic flying qualities of the flying MO head 106.

Figure 7:
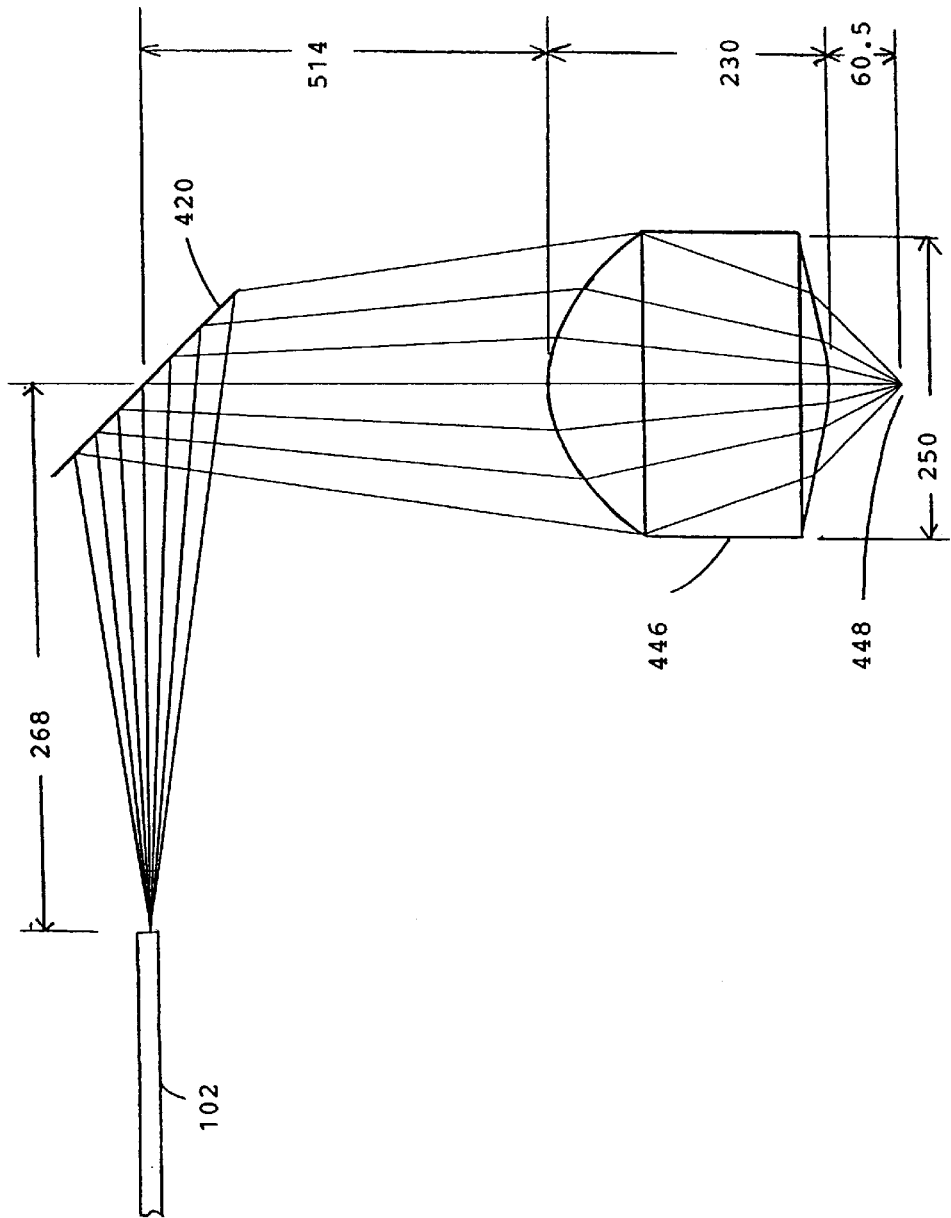
FIG. 7 illustrates an alternative embodiment for the objective optics.

FIG. 7 illustrates an alternative embodiment for the objective optics. In an alternative embodiment, the objective optics 446 of FIG. 4 may include a molded glass bi-asphere design that provides a miniature lens system with high numerical aperture and good off-axis performance. As with the use of the plano-convex GRIN lens above, use of a single optical element bi-asphere objective optics 446 also eliminates the prior art requirement for alignment of multiple objective optic elements relative to each other. In an exemplary embodiment, the asphere lens 446 diameter is approximately 0.250 um, and the asphere lens 446 length is approximately 230 um. An optical path length from a center point of the reflective central mirror portion 420 to the top aspherical surface is approximately 514 um. The single-mode PM optical fiber 102 has an NA of approximately 0.15, and the distal end of the single-mode PM optical fiber 102 is positioned approximately 268 um from the center point of the reflective central mirror portion 420. The top and bottom surfaces of the bi-asphere objective optics 446 are rotationally symmetric to be aspherical as defined by the equation $z=(r^2/R)/(\text{sqrt}(1-(K-1(r/R)^2))+A_4 r^4+A_6 r^6$, where for the top surface approximate values for R=−0.1089 mm, K=−0.8484, $A_4$=−13.739 mm$^{-4}$, and $A_6$=490.5349 mm$^{-6}$, and where for the bottom surface approximate values for R=0.1069 mm, K=−15.9267, $A_4$=−13.8907 mm$^{-4}$, and $A_6$=372.965 mm$^{-6}$. With a preferable index of refraction of 1.605, the effective NA of the bi-asphere objective optics 446 is approximately 0.68. In an exemplary embodiment in which the laser-optics source 231 (FIG. 2) operates at a wavelength of 635 nm, over the propagation angle of the outgoing laser beam 191 and as the reflective central mirror portion 420 rotates, the optical spot 448 is preferably maintained with a full width at half-maximum intensity (FWHM) of approximately 0.52 um and with a RMS wavefront error of approximately $\lambda/20$ at a point approximately 60.5 um below the convex surface of the bi-asphere objective optics 446.

In another embodiment, the objective optics 446 may comprise a molded plastic lens (not shown). If a molded plastic lens is used, the index of refraction of the plastic lens may vary over a desired operating temperature range. Use of a plastic molded lens may require use of a temperature maintaining means on the flying MO head 106. The means for maintaining a temperature may include a small heater coil surrounding the molded plastic lens. In yet another embodiment, a single molded spherical lens with low numerical aperture (0.2–0.4) may be used in conjunction with an aplanatic or solid immersion lens to yield an optical focusing system with relatively high numerical aperture (greater than 0.6). From a manufacturing perspective, molded lenses are attractive because they can be produced in high volume at low cost. One method disclosed here for mass production involves molding a lens array and subsequently sectioning of the array by diamond saw cutting or laser cutting to obtain individual lenses.

Figure 8:
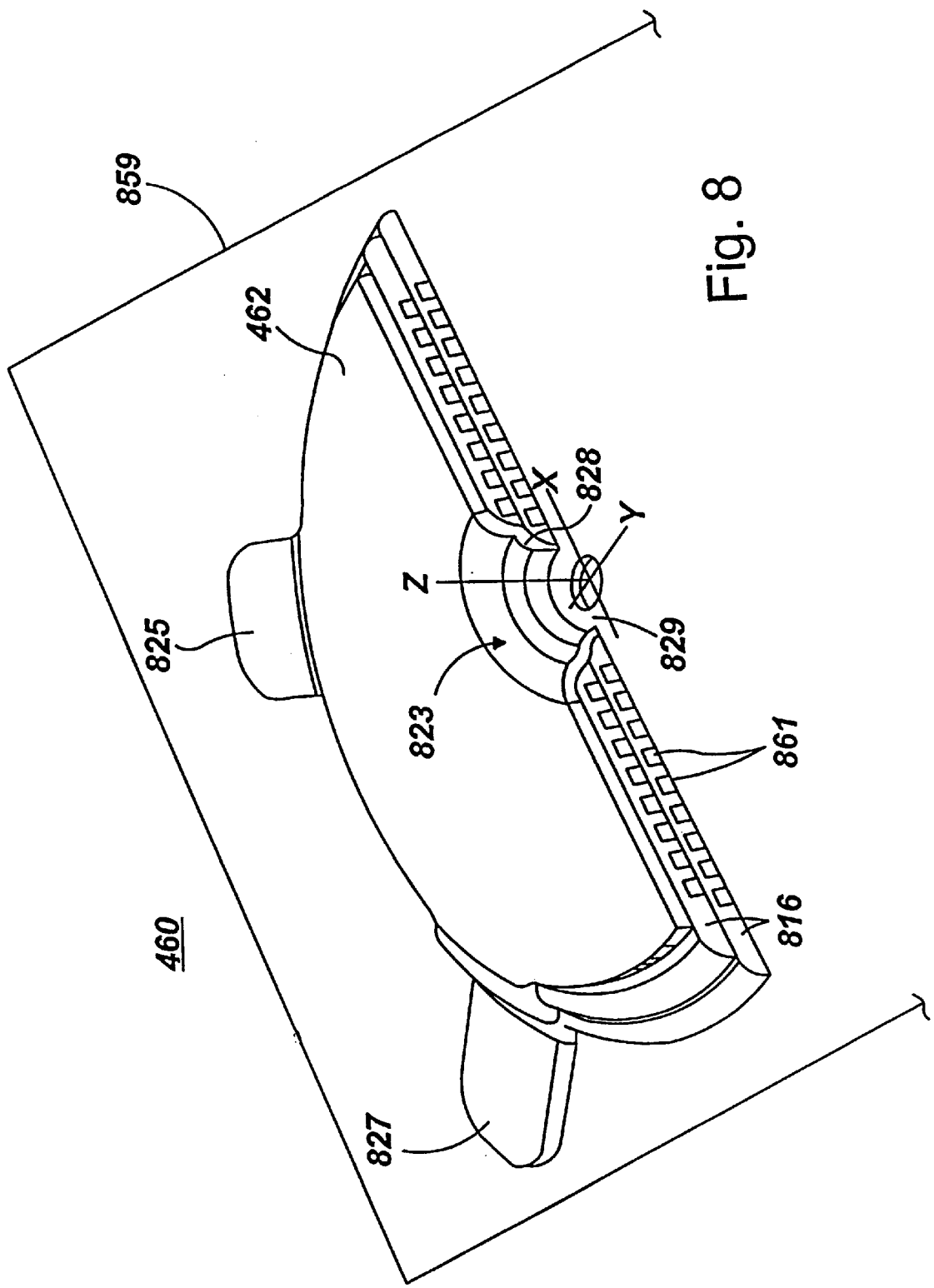
FIG. 8 is a diagram showing a magnetic coil assembly in a representative cutaway view.
Figure 9:
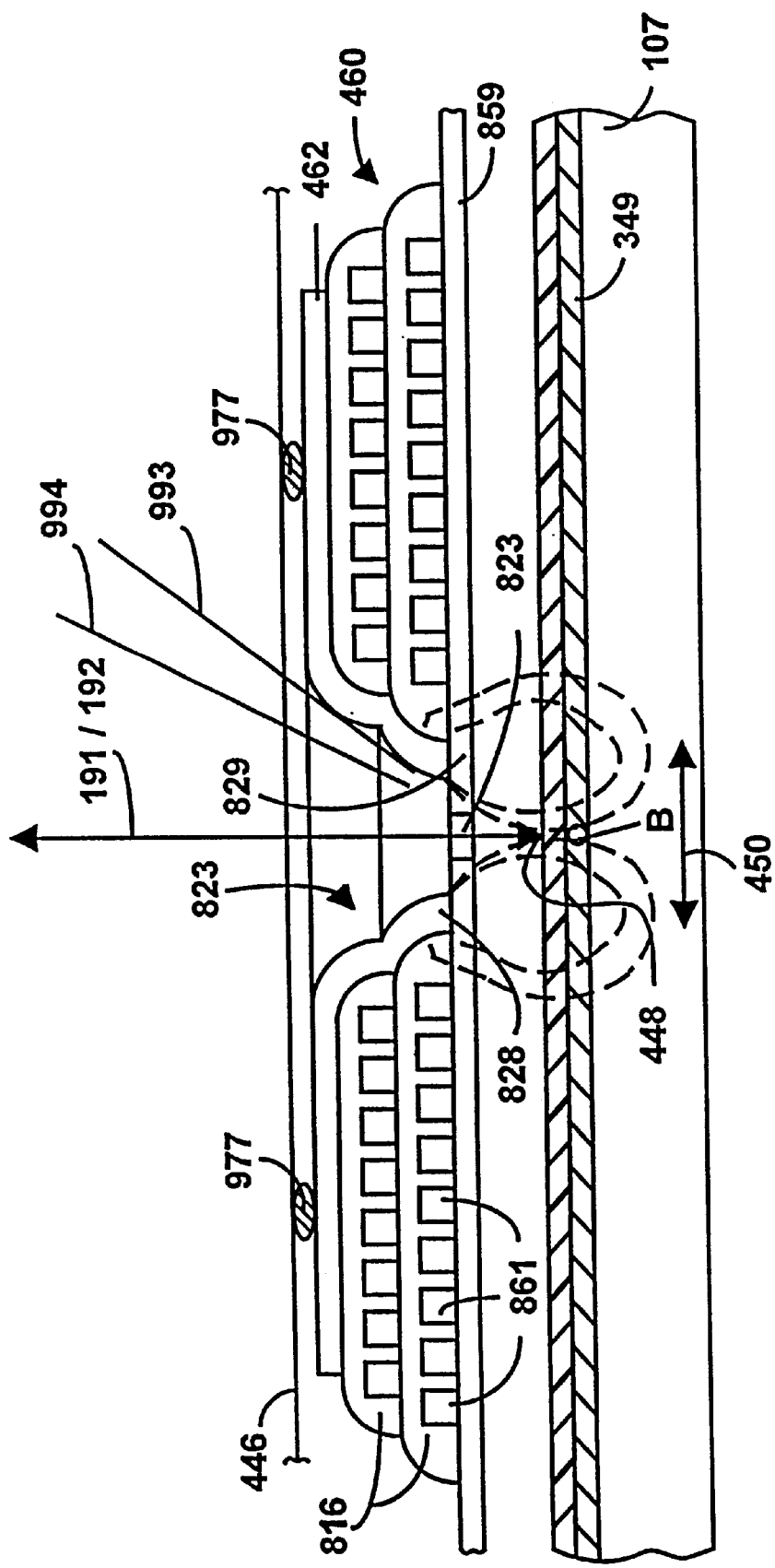
FIG. 9 is a diagram showing a magnetic coil assembly in another representative cutaway view.

FIGS. 8 and 9 are diagrams showing a magnetic coil assembly in two representative cutaway views. In a preferred embodiment, the magnetic coil 460 is a planar microcoil that includes a conductor 861, which is coiled and housed at least partly within a yoke (or permeable flux guide) 462, and encapsulated within an insulation layer 816. In a preferred embodiment, the insulation layer 816 includes a suitable dielectric material, such as a photo-resist material. Although, in the preferred embodiment, the magnetic coil 460 and yoke 462 may be formed on a suitable dielectric protective layer 859, it is understood that use of the magnetic coil assembly of the present invention without a protective layer 859 is also possible. The protective layer 859 preferably includes an aperture formed sufficiently wide for ensuring passage of the outgoing 191 and reflected 192 laser beams (FIG. 1) through a central passage 823 defined by a sloped portion of the yoke 462. The sloped portion of the yoke 462 extends (through a plane defined by at least one layer of the conductor 861) towards the central passage 823, terminating at a tip portion 829 of the protective layer 859. In another embodiment, the magnetic coil 460 and yoke 462 may be partly encapsulated within an overcoat (not shown) for added protection and insulation.

In the preferred embodiment the yoke 462 enhances a magnetic field created by the magnetic coil 460 at the recording/storage 349 layer of the MO disk 107. The sloped portion of the yoke 462 preferably further optimizes enhancement of the magnetic field. In an exemplary embodiment, the yoke 462 is made of a ferromagnetic material having a permeability of approximately 2000, for example, a nickel iron alloy (NiFe), and the yoke ranges in thickness from approximately 4 um to approximately 6 um. In one embodiment, the yoke tip 828 terminates at the upper surface of the protective layer 859 such that a maximal magnetic field is preferably generated by the magnetic coil 460 at or near a point (B) within the recording/storage layer 349 of the MO disk 107 (FIG. 9 illustrates the magnetic field lines with dashed lines).

As shown in FIG. 4c, the magnetic coil 460 and the yoke 462 are mounted horizontally near the air-bearing surface 447 at, or in proximity to, the lower surface of the objective optics 446 and are centered with respect to an optical axis of the objective optics 446. The conductor 861 may comprise a suitable conductor, such as copper, that is coiled to comprise between 15 to 40 turns or, preferably, 21 turns. Preferably, the magnetic coil 460 includes two layers spaced apart in a vertical direction by approximately 6 um. It is understood, however, that in other embodiments, fewer of greater numbers of layers, vertical spacings other than 6 um, as well as fewer or greater numbers of turns are possible. In an exemplary embodiment, a cross-sectional area of the conductor 861 may vary between approximately 2 um and 7 um. In a more specific embodiment, a cross-sectional geometry of the conductor 861 includes a height of approximately 3 um and a width of approximately 2 um. It should be understood that other cross-sectional geometries for the conductor 861 are possible, for example, circular or square cross-sections.

In the preferred embodiment, the magnetic coil 460, the coiled conductor 861, and yoke 462 include a generally elongated geometry. More specifically the magnetic coil 460 (hereinafter referred to as an elongated magnetic coil), the coiled conductor 861 and yoke 462 include an elliptical geometry. In an exemplary embodiment, the outermost dimension of the conductors 861 along the major axis of the elongated magnetic coil 460 is less than approximately 150 microns and along the minor axis less than approximately 120 microns, and the innermost dimension of the conductor 861 along the major axis of the elongated magnetic coil 460 is less than approximately 50 microns and along the minor axis less than approximately 40 microns. In the exemplary embodiment, an innermost dimension of the yoke 462 along the major axis of the elongated magnetic coil 460 is less than approximately 25 microns and along the minor axis less than approximately 20 microns.

Compared to a circular magnetic coil that includes inner and outer dimensions that are equivalent to the inner and outer dimensions of the elongated magnetic coil 460 along the major axis, the elongated magnetic coil 460 provides an advantage in z-axis magnetic field generation efficiency and self-inductance that is better optimized with respect to the required function of moving the optical spot 448 in the disk radial direction 450 by means of the range of motion of the reflective central mirror portion 420 during fine tracking and short seeks to adjacent tracks of a MO disk 107. The elongated magnetic coil 460 geometry provides a denser magnetic field at the surface of the MO disk 107 than would be possible with the aforementioned circular coil. In the preferred embodiment, use of the elongated magnetic coil 460 in combination with the yoke 462 further enhances the magnetic field, preferably, by a factor of approximately two. The low profile and low mass of the elongated magnetic coil 460 and associated yoke 462 minimize interference with the aerodynamic flying qualities of the flying MO head 106 such that the flying MO head 106 and, therefore, the elongated magnetic coil 460 and associated yoke 462 may be positioned close to the MO disk 107. The small diameter of the elongated magnetic coil 460 and yoke 462 provides further benefit, in that, smaller data marks than the prior art may be recorded.

An exemplary cross-section of the elongated magnetic coil 460 along constraining linear boundaries at extent of the inner diameter of the conductors 861 and the permeable yoke 462 is illustrated in the cross-section shown in FIG. 9. In an exemplary embodiment, the sloped portion of the yoke 462 at an inner diameter is shown in a major axis direction (x-axis) 993 of the elongated magnetic coil 460. The geometry of the sloped portion is a function of the optical path design as defined by the passage of the outgoing laser beam 191 through the central passage 823 during rotation of the reflective central mirror portion 420 (FIG. 4). A different geometry 994 applies in the y-z planes. In the preferred embodiment, even though the outermost diameter of the objective optics 446 is larger than the outermost diameter of the elongated magnetic coil 460, the elongated magnetic coil 460 and yoke 462 do not interfere with the optical passage of light to and from the MO disk 107. In an embodiment (not shown) of the elongated magnetic coil 460 with an outer major axis dimension larger than the dimension of the objective optics 446 (as compared to a circular coil that has an equivalent outer dimension) the outer dimension of the elongated magnetic coil 460 along the minor axis would be useful in terms of permitting placement of the offset objective optics 446 as close to a periphery of the flying MO head 106 and, therefore, to increase the number of outer data tracks of a MO disk 107 that may be accessed.

Although the elongated magnetic coil 460 and yoke 462 have been described to include an elliptical geometry, this geometry may be generalized to other situations in which alterations to the geometry of the elongated magnetic coil 460 and yoke 462 are made to accommodate a range of motion of an optical beam within the central passage 823, while also maintaining minimum spacing between the turns of the conductor 861 with the associated yoke 462 and the application point of a maximum magnetic field B. Accordingly, other elongated magnetic coil 460, yoke 462, and conductor 862 geometries are within the scope of the invention; for example, oval, rectangular, etc. In another embodiment, in which the reflective central mirror portion 420 (discussed above) is fixed, a circular elongated magnetic coil 460 and yoke 462 geometry would be beneficial in forming a magnetic field at point B. In the aforementioned embodiment, a vertical geometry for the sloped portion of the yoke 462 would be useful in generating an optimal magnetic field. In the preferred embodiment, an upper surface of the yoke 462 (and therefore the elongated magnetic coil 460) is secured to the objective optics 446 (FIG. 4c) by well known techniques, such as adhesive 977. In another embodiment, the elongated magnetic coil 460 and the yoke 462 may be adhesively secured to the bottom surface 487 (FIG. 4a) of the slider body 444 by a plurality of pads, 825 and 827 (Only two pads are illustrated).

Figure 10:
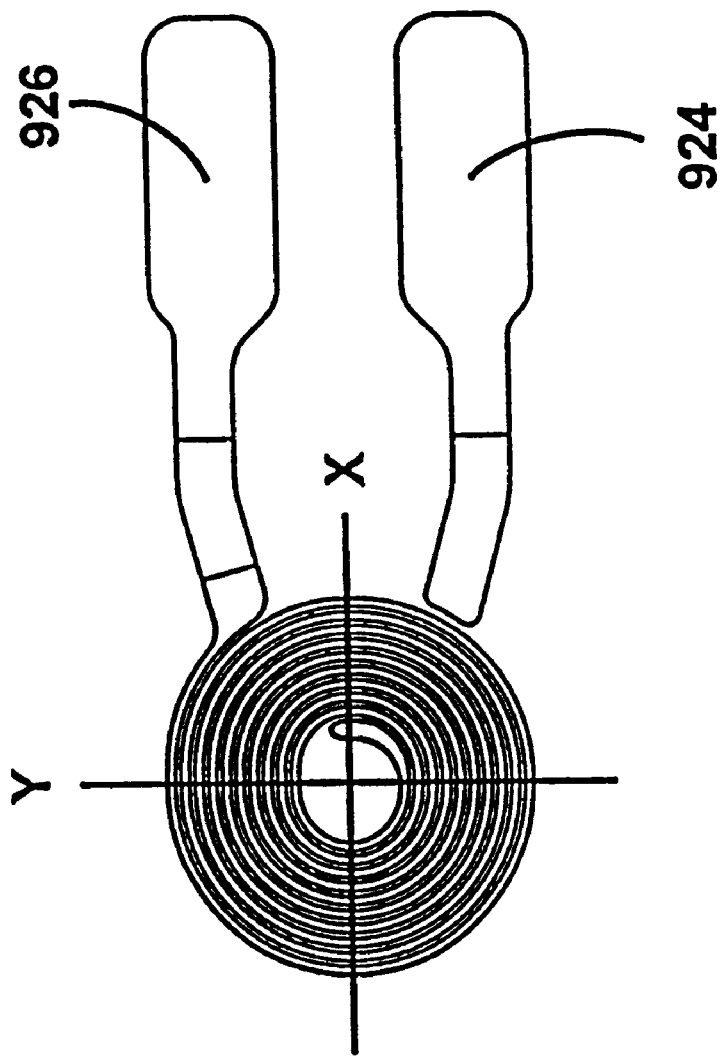
FIG. 10 is a top view of the conductors of the elongated magnetic coil.

FIG. 10 is a top view of the conductors of the elongated magnetic coil. In the preferred embodiment, the conductor 861 includes two pads 924, 926 for connection to an electrical circuit. The pads 924, 926 are preferably made of gold traces. In an exemplary embodiment, with an applied current of less than 50 mA, with an input voltage of less than 12 volts, and with a conductor 861 resistance of less than approximately 22 ohms; the elongated magnetic coil 460 exhibits: a self inductance of less than approximately 200 nH, and a capacitance of less than approximately 5 pf. In the exemplary embodiment, the magnetic field component in a plane perpendicular to the plane of the MO disk 107 (+/−15 degrees) is reversible (80%+/−full strength) in a time of 4 ns. In the exemplary embodiment, a separation distance between the tip 828 of the yoke 462 and the surface of the MO disk 107 is approximately 5 um and 10 um such that a magnetic field of about 290 Gauss at point B is generated generally within the boundaries of the optical spot 448 formed by the outgoing laser beam 191. This compares favorably the prior art, which because of their bulky size have required that they be positioned at a distance farther away from the magnetic recording media (i.e., at other than the bottom surface of a head). The prior art magnetic coil to recording media distance, consequently, imposes increased current requirements for generation of equivalent magnetic field densities at a media surface. In contrast, the present invention requires less current to generate an equivalent prior art magnetic field density at the media surface. In addition, due to limitations of self inductance, the increased size and current requirements of the prior art magnetic coils is limited by the rate at which their magnetic field may be switched. The reduction in size and current provided by the magnetic coil 460 and yoke 462, therefore, increases the rate at which information may be recorded. The bulky prior art coil designs also contribute to head size so as to impose a limit on the number of heads that may be used within any given vertical spacing. For any given field strength, use of the yoke 462 in combination with the elongated coil 460 permits a smaller and less bulky flying magnetic head 106 geometry to be used.

Figure 11:
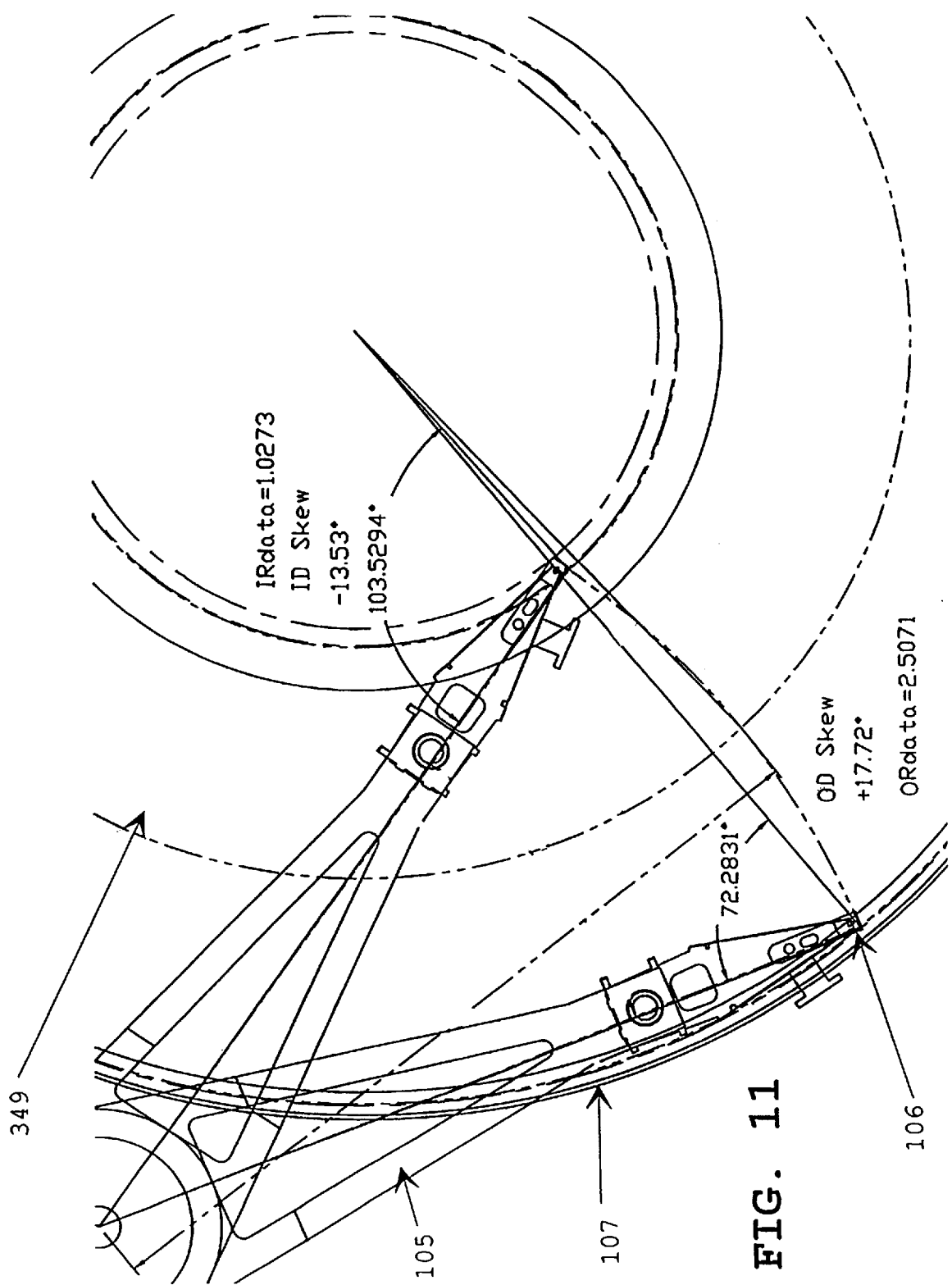
FIG. 11 is a diagram of a magneto-optical head used over a surface of a magneto-optical disk.

FIG. 11 is a diagram of a magneto-optical head used over a surface of a magneto-optical disk. In an exemplary embodiment, the excursion of the optical spot formed by the GRIN lens objective optics 446 over the recording/storage layer 349 of the MO disk 107 is limited at an outer radius by a requirement that the flying MO head 106 maintain a stable aerodynamic flying height and at an inner radius by mechanical constraints of the magneto-optical (MO) data storage and retrieval system 100 that limit movement of the actuator arm 105. Accordingly, in the exemplary embodiment, the objective optics 446 may access a maximum usable area of the MO disk 107 that comprises a minimum inner radius $r_i$ that is 26.093 mm and a maximum outer radius $r_o$ that is 63.680 mm. In a preferred embodiment, the MO disk 107 comprises 1406.5 data tracks/mm (e.g., a track pitch of 0.711 um), and the flying MO head 106 is oriented over the MO disk 107 at the maximal inner excursion with a skew angle of −13.53 degrees and at the maximal outer excursion with a skew angle of 17.72 degrees (relative to tangential lines drawn at the radial data tracks located at the intersection point of the optical spot formed by the objective optics 446 and the minimum inner and maximum outer radii of the recording/storage layer 349, respectively). In the preferred embodiment, the areal density over all the MO disk 107 radii is maximized using "zone recording" techniques to achieve an exemplary local area density of approximately 3.6 Gb per square inch. A maximum user data rate at the outer radius of the MO disk 107 comprises at least 120 Mbits/sec (at a rotation rate of approximately 4500 RPM). Those skilled in the art will recognize that the user data rate $R_D$ may be calculated using the relationship $R_D=(v) \times (D_L)$ (where v=disk velocity and $D_L$=linear bit density of the MO disk 107). The disk velocity $v_0$ at the outer radius of the MO disk 107 may be calculated using the relationship $v_0=r_0\omega=(63.680 \text{ mm}) \times (2\pi \text{ rad/rev}) \times (4500 \text{ rev}/60 \text{ sec})=30.008$ m/s. Accordingly, the linear bit density $D_L$ required to sustain the desired maximum user data rate at the outer radius may be calculated using the relationship $D_L=R_D/v_0=(120 \text{ Mbits/sec})/(30.008 \text{ m/s})=3998.9$ bits/mm.

Figure 12:
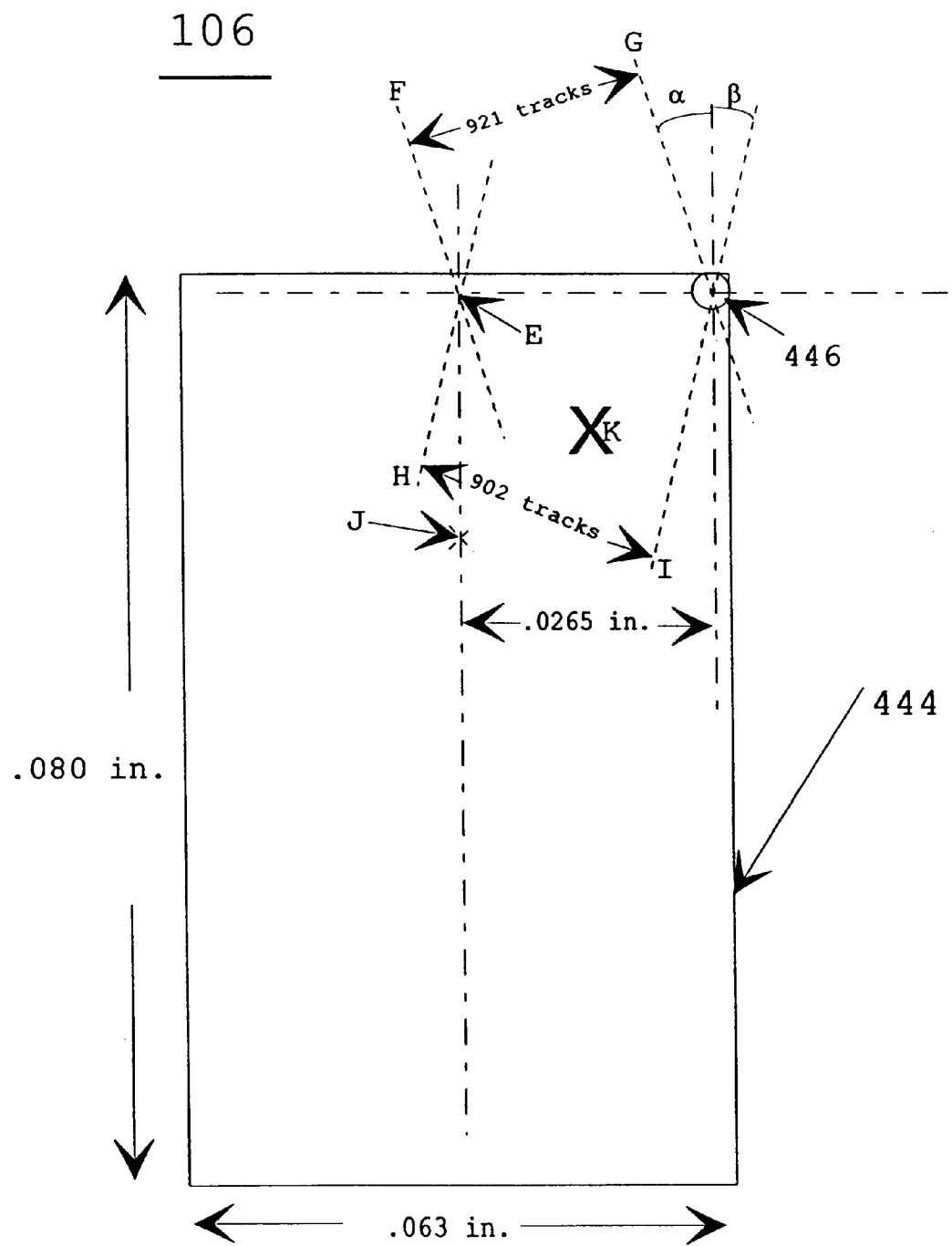
FIG. 12 is a diagram illustrating the data tracks that are gained and lost by positioning the objective optics and magnetic coil at a corner of the magneto-optical head.

FIG. 12 is a diagram illustrating the data tracks that are gained and lost by positioning the objective optics and magnetic coil at a corner of the magneto-optical head. Those skilled in the art will recognize that use of objective optics along a central axis and inward from a periphery of a flying MO head results in data tracks at the outer radius of a respective MO disk that may not be accessed. In the present invention, because the GRIN lens objective optics 446 and the elongated magnetic coil 460 are located towards or at a periphery of the flying MO head 106 (as compared to locating the objective optics 446 inward from the periphery and along a central axis of the flying MO head 106), the radial data tracks that may be accessed at the outer excursion of the magneto-optical head 106 is offset by approximately an equal number of radial data tracks that are inaccessible at the inner excursion of the flying MO head 106. The present invention takes advantage of the increased recording capacity of the data tracks at the outer radii, as compared to the recording capacity of the data tracks at the inner radii. As compared to the prior art, by positioning the objective optics 446 and elongated magnetic coil 460 offset from the central axis, the present invention increases the amount of data that may be written and read using the MO disk 107.

The increase in data that may be accessed from the recording/storage layer 349 of the MO disk 107 may be illustrated by comparing a position of the objective optics 446 and the elongated magnetic coil 460 at a corner of the flying MO head 106 to an objective optics and a magnetic coil positioned along a central axis. In FIG. 12, the comparison is illustrated by a perpendicular distance between a tangential line drawn at a radial data track located at the optical spot formed by the objective optics 446 and a tangential line drawn at a radial data track located under point E. In an exemplary embodiment, the objective optics 446 and the elongated magnetic coil 460 are placed 0.0265 inches off-center from the central axis at a corner of the flying MO head 106. In the exemplary embodiment, at the maximal outer excursion of the flying MO head 106, the perpendicular distance between the tangential lines (F and G) may be calculated as $d_o=(0.0265 \text{ in}) \times (\cos 17.72 \text{ degrees})=0.02525$ in=641.165 um and at the maximum inner excursion between the tangential lines (H and I) as $d_i=(0.0265 \text{ in.}) \times (\cos 13.53 \text{ degrees})=0.025765$ in=654.42 um. Accordingly, compared to point E, the placement of the objective optics 446 and elongated magnetic coil 460 at a corner of the flying MO head 106 results in a gain of approximately 902 data tracks at the maximal outer excursion of the flying MO head 106 (e.g., 641.165 um/0.711 um/track), and a loss of approximately 921 tracks at the maximal inner excursion of the flying MO head 106 (e.g., 654.42 um/0.711 um/track). In the exemplary embodiment, the data gained with the maximal outer excursion of the flying MO head 106 may be calculated using the relationship $C_O$=(902 tracks)×($D_L$)×($2\pi$)×($r_o'$), where $r_o'$ is a mean radius of the recording tracks gained (calculated as $r_o$−(0.5)× (641.165 um)=63.3594 mm), and the data lost with the maximal inner excursion of the MO head 106 may be calculated from the relationship $C_i$=(921 tracks)×($D_L$)× ($2\pi$)×($r_i'$), where $r_i'$ is a mean radius of the recording tracks lost (calculated as $r_i$−(0.5)×(654.42 um)=26.4202 mm). Accordingly, $C_O$=1.43595 Gb=179.493 MB, and $C_i$=0.061139 Gb (Gigabits)=76.423 MB (Megabits). Compared to objective optics positioned at point E on the magneto-optical head 106, the exemplary embodiment provides a net gain of 103.070 MegaBytes that may be read and written from the MO disk 107. Thus, compared to prior art objective optics located along a central axis and inward from the periphery of an MO head (e.g., point F), placement of the objective optics 446 and the elongated magnetic coil 460 at the periphery of the flying MO head 106 provides an increase in the amount of data that may be read and written by the magneto-optical (MO) data storage and retrieval system 100. Although, the objective optics 446 has been described as being located along a periphery of the flying MO head 106, in other embodiments, other positions of the objective optics 446 and elongated magnetic coil 460 may also provide improved data access.

Figure 13:
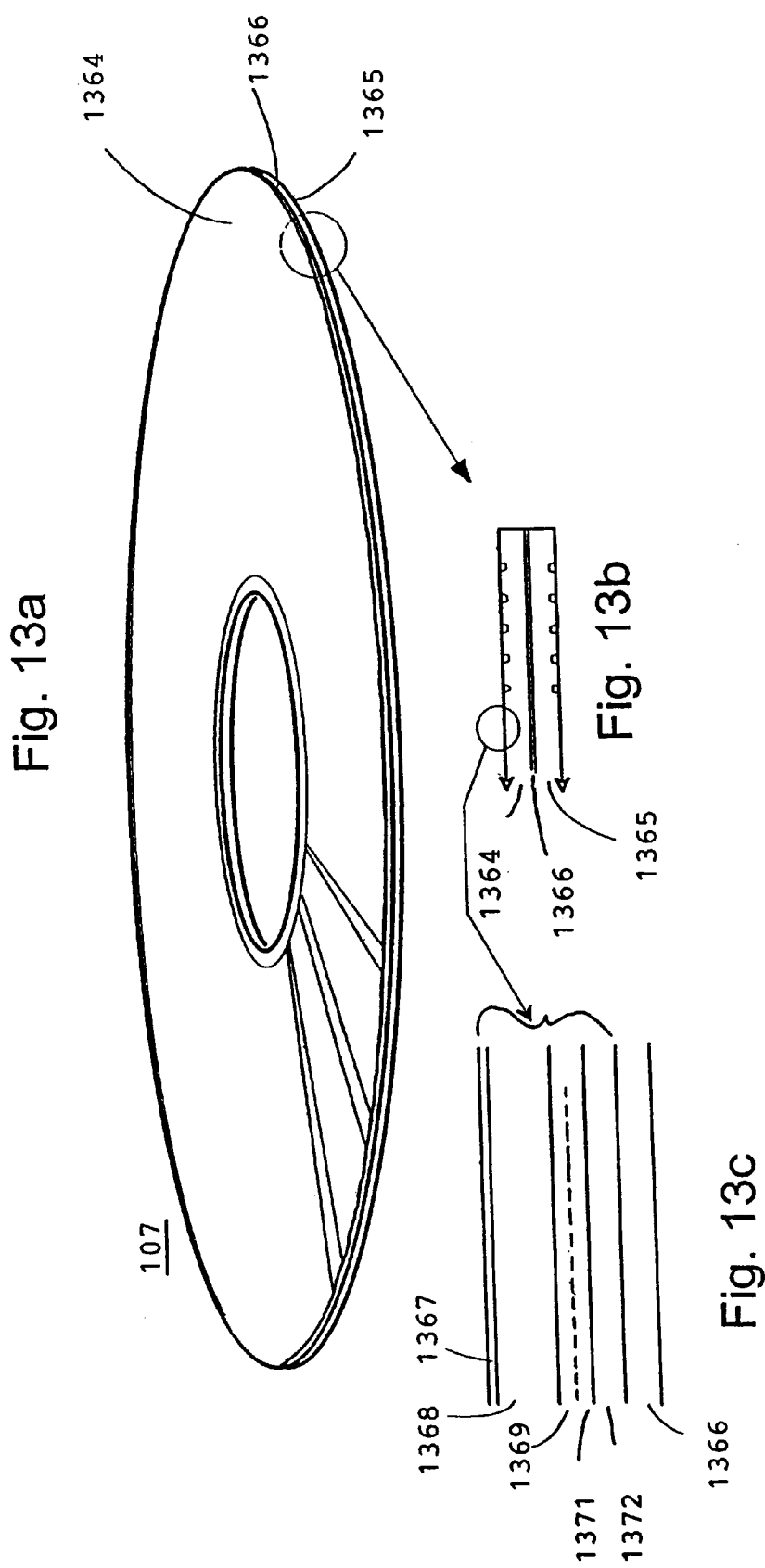
FIGS. 13a–13c illustrate, a respective perspective section, side section, and exploded side section of the MO disk of the present invention.

FIGS. 13a–c illustrate, a respective perspective section, side section, and exploded side section of the MO disk of the present invention. As was discussed above, the present invention transmits polarized light to and from a set of MO disks 107 using low profile and small mass optical paths. The low profile and small mass optical paths enable the present invention to use a plurality of double sided first surface MO disks 107 at a very small spacing between the disks. Unlike the prior art, the double-sided first surface MO disks 107 of the present invention utilize magnetically-induced super resolution (MSR) film structures. As compared to conventional quadrilayer MO disks, an MSR film structure can support readout of at least one data domain mark within any given optical spot 448 formed by the outgoing laser beam 191 on and MO disk 107 and, preferably a plurality of data domain marks. The MO disk 107 of the present invention uses thermally-induced masking of written magnetic domain patterns in the MSR film structure to enable extension of the modulation transfer function of the readout optical system. In the multi-layered recording/storage layer 349 structure shown in FIGS. 13a–c, adjacent magnetic layers are coupled by an atomic exchange mechanism to form magnetic apertures, which are smaller than the optical beam size. There are several methods for selecting which magnetic domain within the illuminated area of the disk is selected and presented to the readout beam, mainly front-aperture detection (FAD), rear-aperture detection (RAD), and central-aperture detection (CAD). These methods differ in the location of the domain within the illuminated area of the disk which is selected for display by the reflected laser beam 192. In the preferred embodiment, the CAD method is used for selection of a particular magnetic domain; however, it will be appreciated that the invention is not limited to this method. The CAD, FAD, and RAD methods are illustrated and discussed below with reference to FIG. 14 below. In these three techniques, data is written onto the storage layer 1371 with the flying MO head 106 flying close to the MO disk 107, which is modulated using the aforementioned MFM recording techniques. The elongated magnetic coil 460 and yoke 462 (FIG. 4c) of the present invention are a very small diameter and, yet, do not interfere with passage of light through the objective optics 446. The magnetic field created by the elongated magnetic coil 460 can be directed to impinge on a smaller area of the MO disk 107 than the prior art, and, therefore to record data as magnetic domain marks that are smaller than the optical spot 448 size.

In an exemplary embodiment, the MO disk 107 is fabricated as a double sided first surface MSR media that includes storage layers 1364 and 1365, and embossed pits on opposing sides of a substrate 1366. Each layer preferably includes a lubricant/protective layer 1367 of a thickness approximately 3 nm. In one embodiment, the lubricant/protective layer 1367 may include a thin amorphous carbon film. Preferably, the lubricant/protective layer 1367 includes a transmittance of at least 0.95. The lubricant/protective layer preferably facilitates dynamic load and unload of the flying MO head 106 to and from the flying condition, and also supports long term stability during track-following and track seeking. The lubricant/protective layer 1367 also provides an anti-static function to keep the MO disk 107 resistivity below $10^{12}/\square$ ohms. The lubricant/protective layer 1367 is deposited over a silicon nitride (SiN) upper dielectric layer 1368. Although in an alternative embodiment, the lubricant/protective layer 1367 can provide a protective function, in the exemplary embodiment, the dielectric layer 1368 also serves this function. The upper dielectric layer 1368 includes a thickness typically in the range of 60–100 nm. The upper dielectric layer 1368 acts to provide a number of functions, including: (a) a hard protective coating to prevent film damage during disk handling or inadvertent head-disk contact during device operation; (b) thickness, refractive index, and thermal properties that adjust for the reflectance and Kerr effect properties of the layers below; (c) sufficient impermeablity to protect and passivate the chemically active MO layers below. The upper dielectric layer 1368 is deposited over a plurality of magnetically active layers 1369 and 1371 that have a total thickness of approximately 40–100 nm. The layers 1369 and 1371 preferably function to yield a readout aperture with a read power of approximately 3 mW. The upper layer 1369 is a read layer and is approximately 40 nm thick to preferably yield a strong Kerr effect and maximal signal-to-noise performance. In an exemplary embodiment, the upper layer 1369 is a ferrimagnetic material such as GdFeCo. In the exemplary embodiment, the lower layer 1371 is data storage layer comprised of a ferrimagnetic alloy such as DyFeCo having a thickness of approximately 40 nm. In both layers 1369 and 1371, each magnetic data domain consists of a region of the layer that is magnetized in a perpendicular direction to the surface of the MO disk 107. The upper 1369 and lower 1371 layers preferably have a low transmittance such that an optical reflective function is provided by the layers above. This compares favorably to traditional quadrilayer MO disk media, in that, a separate reflective layer is not necessarily required. The lower layer 1371 is deposited on top of a silicon nitride dielectric layer 1372 that has a thickness of approximately 20–40 nm. The lower dielectric layer 1372 is disposed on the substrate 1366. The thickness of the various layers of the MO disk 107 are preferably selected for proper thermal behavior (appropriate power sensitivity and good temperature gradients for writing and for sharp MSR aperture formation) and for good exchange coupling.

In an exemplary embodiment, the substrate 1366 may be a single piece metal such as Aluminum Magnesium (AlMg) or, for alternatively, a plastic, a glass, a ceramic substrate, or a two-piece laminated plastic substrate. It is understood, however, that other materials for the substrate 1366 are within the scope of the present invention. The substrate 1366 should be sufficiently rigid to resist deformation when the MO disk is spun at 4500 rpm. The substrate 1366 thickness is preferably in a range of 1.20+/−0.05 mm. If a plastic substrate is used, a thermal heat sinking layer may be deposited directly on the substrate 1366 to control lateral heat flow, for example a metallic layer. If a metal substrate is selected, a hard overcoat such as nickel phosphorous (NiP) may be deposited on the substrate 1366 before the deposition of the dielectric layer 1372. The overcoat should have a sufficiently low thermal conductivity such that it does not degrade the writing sensitivity of the disk (i.e., elevate the writing/reading/erasing power requirement). If a plastic is selected, tracking and format information may be embossed ("hard formatting"). If a metal or glass substrate is selected, mass replicated format features (e.g., photopolymerization) may be used. Alternatively, "soft formatting" by magnetic layer writing may be used.

In an alternative exemplary embodiment, the layers 1369 and 1371 may be separated by a magnetic or non magnetic coupling layer (not shown) so as to improve exchange coupling. In another alternative exemplary embodiment, the layers 1369 and 1371 may comprise multi-layers deposited contiguously, or separated by intervening dielectric layers, depending on the interlayer magnetic coupling and resultant MSR performance desired.

Figure 14:
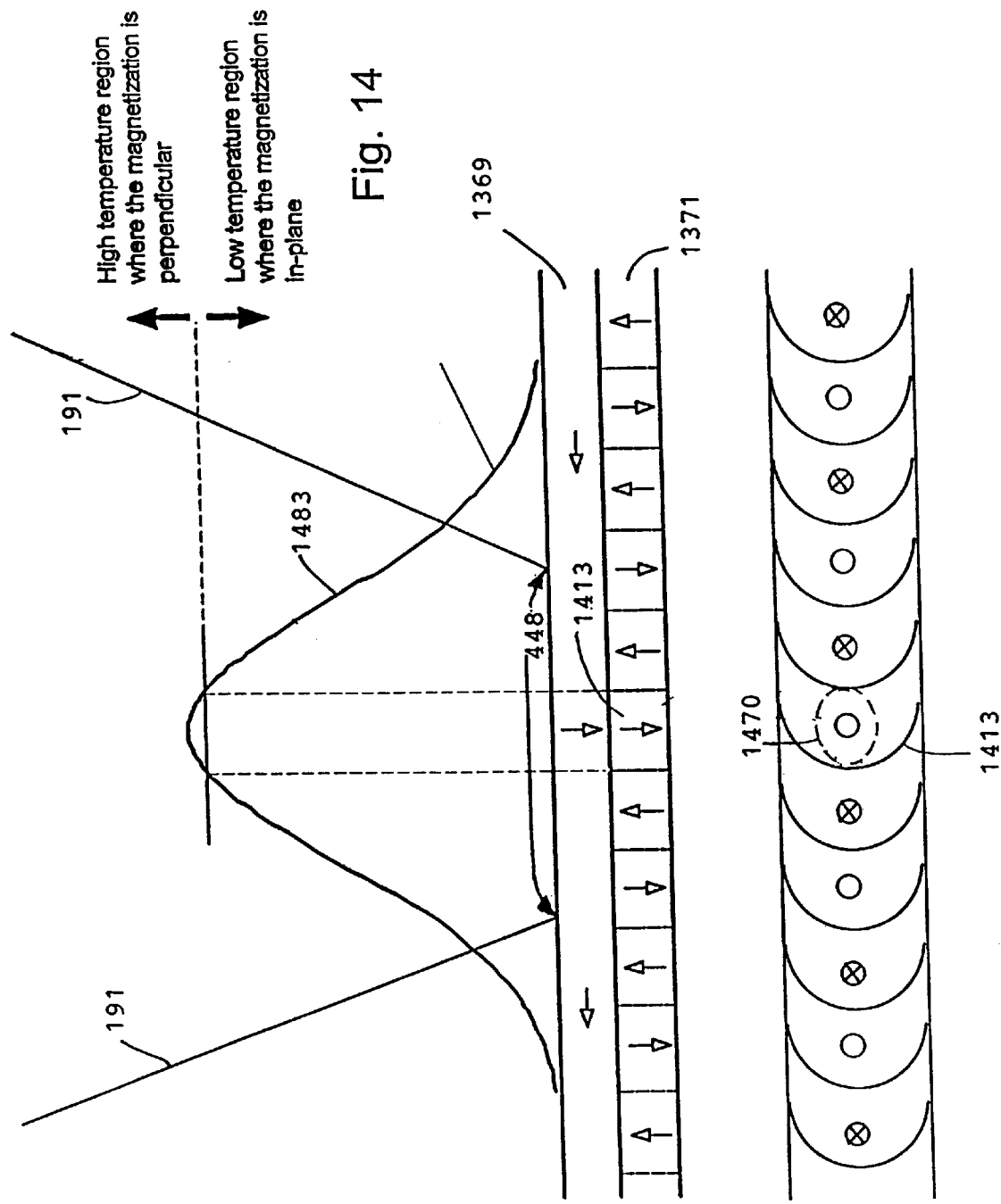
FIG. 14 illustrates a temperature profile of the CAD MSR recording method and a top view of a recording layer, respectively.

FIG. 14 illustrates a temperature profile of the CAD MSR recording method and a top view of a recording layer, respectively. With the CAD method mentioned above, MSR creates an essentially elliptically shaped aperture 1470 inside of a particular isotherm in the read layer 1369 due to an elevated temperature profile created by the outgoing laser beam 191. By carefully designing the MO film composition, stack architecture, and thickness, the temperature profile 1483 can be tailored for a desired power sensitivity as well as signal and noise performance. The aperture 1470 includes a high temperature zone in which the net polarization recorded storage layer is copied upward to the read layer 1369. The copying is a parallel coupling of the perpendicular magnetization (to the disk plane) of a particular data domain mark 1413 in the storage layer 1371 to the magnetization of the read layer 1369. Near room temperature, the read layer 1369 is magnetized in-plane so as to induce no Kerr effect within the optical spot 448 that would normally be formed by the incident outgoing laser beam 191. When a magnetization between layers is induced by temperature elevation, a relatively strong Kerr signal is available only for the data mark 1413 not masked by the aperture for the outgoing laser beam 191 incident on the read layer 1369. The CAD method is advantageous for a number of reasons, including: the aperture shape is easily controlled by the level of readout laser power (typically 2–3 mW); the aperture shape masks not only magnetization information that would otherwise interfere with the data marks to be read along the data track, but it also shields adjacent track information, thus enabling higher track and linear densities; no readout magnetic field is required; and the read layer and write layer structure is relatively simple.

Figure 15:
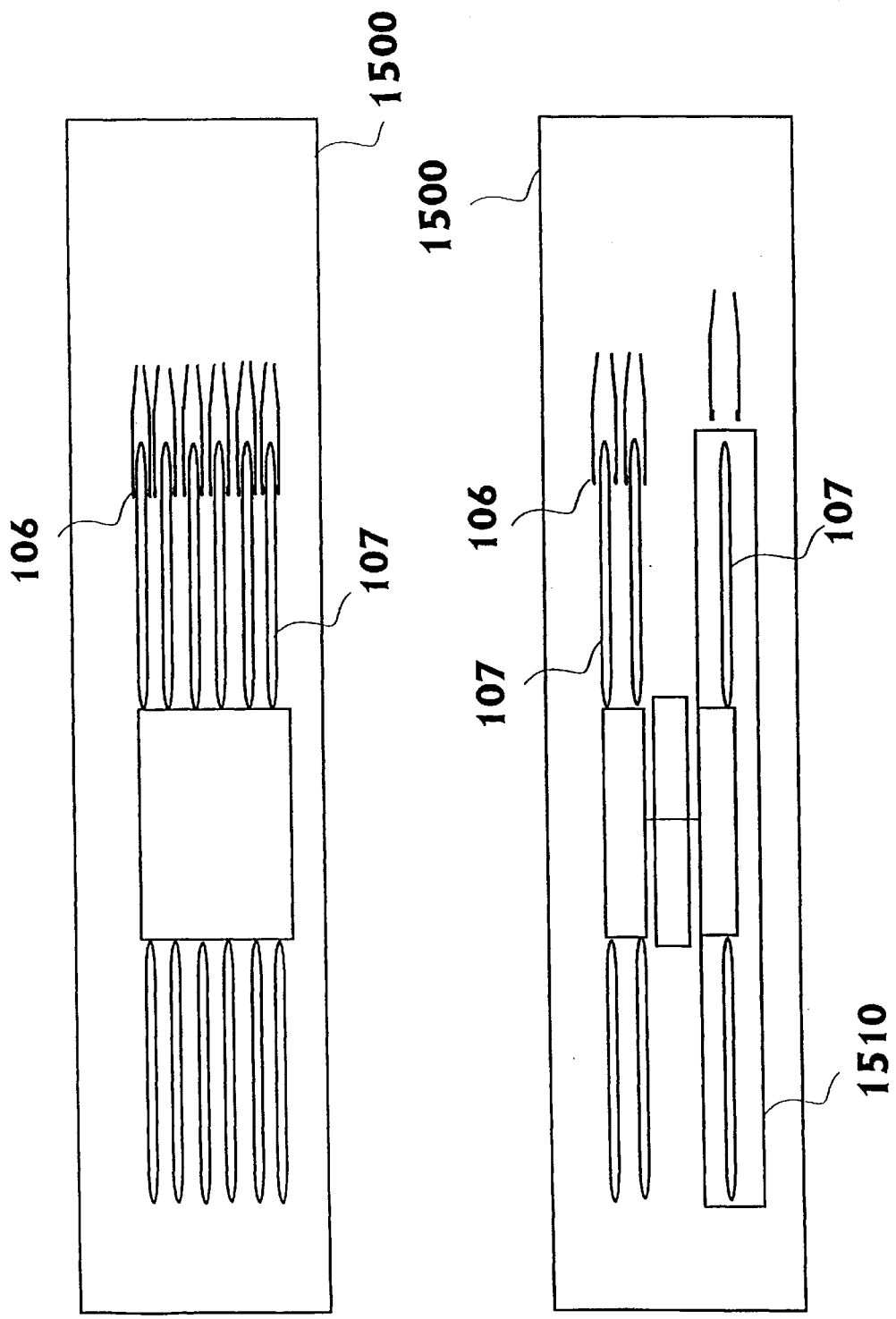
FIG. 15 is a diagram illustrating a magneto-optical disk drive.

FIG. 15 is a diagram illustrating a magneto-optical disk drive. In a preferred embodiment, the magneto-optical system 100 comprises a compact high-speed and high-capacity MO disk drive 1500 that includes an industry standard 5.25 inch half-height form factor (1.625 inch), at least six double-sided MO disks 107, and at least twelve flying MO heads 106. As discussed above, the flying MO heads 106 may be manufactured to include optical and magnetic elements that provide a very small mass and low profile high NA optical system so as to enable utilization of at least one double-sided MSR MO disk 107 and preferably a plurality of double-sided MSR MO disks 107 within a small form factor disk drive and; therefore, to comprise a higher areal and volumetric and storage capacity than is permitted in an equivalent volume of the prior art. In the preferred embodiment, a spacing between each of the at least six MO disks 107 is 0.182 inches. In an exemplary embodiment, the elongated magnetic coil 460 and yoke 462 enable each side of the MO disk 107 to comprise at least 5 GigaBytes of written data marks. In an exemplary embodiment, the objective optics 446 provides an approximately 0.54 um optical spot size 448 to enable reading of the data marks The present invention should not, however, be limited by these specifications as it is understood that in alternative embodiments other spacings between the set of MO disks 107 are possible to achieve other volumetric storage capacities; and with other optical spots sizes and coil and yoke designs, reading and writing of other MO disk 107 areal data capacities.

In an alternative embodiment, the half-height form factor MO disk drive 1500 may include a removable MO disk cartridge portion 1510 and two fixed In an alternative embodiment, the half-height form factor MO disk drive 1500 may include a removable MO disk cartridge portion 1510 and two fixed internal MO disks 107. By providing the removable MO disk cartridge portion 1510, the fixed internal and removable combination permits external information to be efficiently delivered to the MO disk drive 1500 for subsequent transfer to the internal MO disks 107. The copied information may, subsequently, be recorded back onto the removable MO disk cartridge portion 1510 for distribution to other computer systems. In addition, the removable MO disk cartridge portion 1510 allows for very convenient and high speed back-up storage of the internal MO spinning disks 107. The fixed internal and removable combination also permits storage of data files on the removable MO disk cartridge portion 1510 and system files and software applications on the internal MO spinning disks 107. In another alternative embodiment (not shown) an MO disk drive 1500 may include: any number (including zero) of internal MO disks 107 and/or any number of MO disks 107 within any number of removable MO disk cartridge portions 1510.

The present invention may be practiced in many different optical disk drive embodiments, for example: read only optical drives, without use of a yoke, with other form factors, with other optical sources of light, with other types of optical fibers, with other optical elements. For example, the low profile optical paths disclosed by the present invention may be used to convey information to and from a storage location without requiring objective optics (e.g., using a tapered optical fiber or an optical fiber with a lens formed on an end); and/or reflective substrates (e.g., using a curved optical fiber to convey information along surfaces of the magneto-optical head 106); and/or quarter-wave plates, as in a system that effectuates compensation of PM optical fibers using dynamic phase compensation. Free space optical paths may also be used to deliver and receive laser light, for example, with a suitably aligned laser diode and detector mounted on the actuator arm or, alternatively, on the flying head itself. The present invention does not necessarily require use of rotary actuator arms, for example, linear actuator arms may be used.

Although the present invention has been described herein with reference to particular embodiments thereof, a latitude of modification, various changes and substitutions are intended in the foregoing disclosure, and it will be appreciated that in some instances some features of the invention will be employed without a corresponding use of other features without departure from the scope of the invention as set forth.

What is claimed is:

1. An information storage system, said system comprising:
   a magnetically-induced super resolution storage medium;
   a source of light;
   a flying head disposed between said storage medium and said source and capable of flying over said storage medium;
   at least one optical element comprising an optical fiber, a lens, and a steerable micro-machined mirror coupled to said head for directing said light toward said storage medium and for receiving a reflection of said light from said storage medium; and
   magnetic field generating means coupled to said head for controllably generating a magnetic field in a region of said surface of said storage medium that is illuminated by said light.

2. The system of claim 1, wherein said magnetic field generating means comprises:
   a coil, coupled to said lens, said coil being generally elliptical in shape and having a maximum and minimum outer diameter, wherein said minimum outer diameter of said coil is less than said outer diameter of said lens.

3. The system of claim 2, wherein said coil is disposed between said lens and said storage medium.

4. The system of claim 1, wherein said source of light comprises a substantially single frequency source of light.

5. The system of claim 1, wherein said at least one optical element comprises a quarter-wave plate disposed between said mirror and said coil.

6. The system of claim 1, wherein said lens comprises a GRIN lens.

7. The system of claim 6, wherein said GRIN lens comprises a plano-convex lens.

8. The system of claim 1, wherein said lens comprises an aplanatic lens.

9. The system of claim 1, wherein said lens comprises a solid immersion lens.

10. The system of claim 1, wherein said lens comprises a molded glass bi-asphere lens.

11. The system of claim 1, wherein said lens comprises a molded plastic lens.

12. The system of claim 1, wherein said lens and said fiber are disposed along an outer periphery of said assembly.

13. The system of claim 1, wherein said light illuminating said region of said surface of said storage medium encompasses a plurality of said magnetic domains along a data storing track of said medium.

14. The system of claim 1, wherein said storage medium comprises:
    a substrate; and
    at least one layer supported by said substrate, said at least one layer including a surface exposed to said light, said layer containing magnetic material for storing data by means of magnetically induced super-resolution.

15. The system of claim 1, wherein said storage medium comprises a plurality of adjacent sublayers, wherein said adjacent sublayers are coupled by an atomic exchange mechanism.

16. The system of claim 15, wherein at least one of said sublayers comprises ferrimagnetic material.

17. The system of claim 16, wherein said ferrimagnetic material is GdFeCo.

18. The system of claim 16, wherein said ferrimagnetic material is DyFeCo.

19. The system of claim 15, wherein said plurality of adjacent sublayers comprise:
    a storage layer; and
    a read layer.

20. The magneto-optical storage system of claim 19, wherein said plurality of adjacent sublayers farther comprise an intermediate layer disposed between said storage layer and said read layer.

21. The system of claim 19, wherein said storage layer provides an optical reflective function.

22. The system of claim 1, wherein said head comprises an outer periphery and wherein said at least one optical element is coupled to said head between said periphery and a central axis thereof.

23. The system of claim 1, wherein said mirror being a mirror steerable radially by voltage signals.

24. The system of claim 1, wherein said storage medium includes magnetic domains and whereby said region illuminated by said light encompasses a plurality of said magnetic domains disposed along a track of said medium.

25. The system of claim 1 wherein said coil is elongated radially.

26. The system of claim 1 wherein said light is a substantially single frequency source of light.

27. An information storage system, said system comprising;
    a magnetically-induced super resolution storage media;
    a source of light;
    a flying head coupled to a rotary actuator for positioning said head over said media;
    at least one optical element for coupling a light between said source of light and said storage media said at least one optical element disposed on said head in proximity to a surface of said storage media;
    magnetic field generating means for controllably generating magnetic domains in a region of said surface of said storage media that is illuminated by said light, said magnetic field generating means disposed on said head in proximity to said surface of said storage media wherein at least one optical element comprises:
        a polarization maintaining optical fiber for conducting said light;
        a micro-machined mirror disposed on said flying head so as to direct said light between said polarization maintaining optical fiber and said storage medium; and
        optics for focusing said light.

28. The system of claim 27, wherein said micro-machined mirror comprises a steerable mirror capable of dynamically altering a direction of said light.

29. The system of claim 27, wherein said head comprises a periphery, and wherein said optics is disposed at said periphery such that an area of said storage medium surface that is accessible by said at least one optical element is increased compared to an area if said optics were disposed along a central axis of said head.

30. A method of passing light between a source and a magnetically-induced super resolution storage medium comprising the steps of:
    providing a first head flying in proximity to said storage medium;
    coupling at least one optical element comprising a steerable micro-machined mirror and a magnetic field generating element to said head; and directing said light between said source and said medium and through said magnetic field generating element using said at least one optical element, further comprising, directing said light through an optical fiber carried on said head, the output of said fiber being aligned with said mirror.

31. The method as recited in claim 30, further comprising a step of providing said light with a substantially single wavelength.

32. The method as recited in claim 30, wherein said step of directing said light comprises using said micro-machined mirror to alter an optical path of said light radially both over a singe track and from track to track on said medium.

33. The method as recited in claim 30, wherein said head comprises an outer periphery and wherein said at least one optical element is coupled to said head between said periphery and a central axis of said head.

34. The method as recited in claim 32, further comprising the steps of providing a second head in proximity to an opposite surface of said storage medium and coupling at least one optical element comprising a steerable mirror and magnetic field generating element to said second head.

35. An information storage system, said system comprising;
   a magnetically-induced super resolution storage medium;
   a light source;
   a flying MO head disposed on a rotary actuator in proximity to a surface of said storage medium;
   at least one optical element comprising a PM (polarziation maintaining) optical fiber coupled to said head for illuminating said storage medium with said light from said source and for receiving reflected light from said storage medium cooperating with a steerable micro-machined mirror mounted on said flying head for directing said light and said reflected light; and
   magnetic field generating means coupled to said head for controllably generating a magnetic field in a region of said surface of said storage medium that is illuminated by said light enabling accessing data on said storage medium.

36. The system of claim 35, wherein said light source comprises a DFB (distributed feedback) laser.

37. The system of claim 35, wherein said steerable mirror comprises a steerable micro-machined mirror, rotatable about a rotation axis so that propagation angle of said light is changed before transmission to objective optics and thereby to said storage medium surface.

38. The system as claimed in claim 37, wherein said mirror is steered radially to move said beam from track to track or to accurately locate said beam over a track.

39. The system as claimed in claim 37, wherein said mirror is steerable radially in response to a differential voltage.

40. The system as claimed in claim 37, wherein course tracking is achieved by voltage signals applied to an actuator arm supporting said mirror, fine tracking being achieved by said mirror.

41. An information system, said system comprising:
   a plurality of magnetically induced super-resolution storage media;
   a source of light;
   optical directing means for controllably directing a light from said source of light to one of said plurality of said storage media;
   a flying magneto-optical head disposed in proximity to a surface of each of said plurality of storage media;
   at least one optical element comprising optical fiber coupled to said magneto-optical head for illuminating said storage media and for receiving a reflected light from said storage media;
   a radially steerable micro-machined mirror mounted on said flying head for directing said light both to and from said media;
   magnetic field generating means coupled to said magneto-optical head for controllably generating a magnetic domain mark in a region of said surface of said storage that is illuminated by said light; and
   optical detection means for detecting said reflected light.

42. The system of claim 41, wherein said light encompasses a plurality of magnetic domain marks along a track of said storage media.

43. The system of claim 41, wherein said at least one optical element comprises an objective optics, said objective optics comprising a lens having an outer diameter, and said magnetic field generating means is a generally planar, substantially elliptical coil having a radial major axis.

44. The system of claim 43, wherein said magnetic field generating means comprises;
   said coil aligned with said at least one optical element, wherein said major axis of said coil is greater than said outer diameter of said objective optics.

45. The system of claim 44, wherein said coil is disposed between said objective optics and said storage media.

46. The system of claim 41, wherein at least one of said storage media comprises double-sided storage media, and each of said heads is capable of independent alignment of said light onto said associated disc.

47. The system of claim 41, wherein at least one of said plurality of said storage media is removable.

48. The system of claim 41, wherein said plurality of storage media comprises at least six double-sided first surface storage media disposed within a half-height form factor.

49. The system of claim 48, wherein a media to media spacing is approximately 0.182 inches.

* * * * *